(12) United States Patent
Miyajima et al.

(10) Patent No.: US 6,445,484 B1
(45) Date of Patent: Sep. 3, 2002

(54) TORSIONAL ROCKER

(75) Inventors: Hiroshi Miyajima, Hachioji; Kenji Murakami, Hino; Toshiharu Hidaka; Tomoko Arikawa, both of Hachioji, all of (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/570,596

(22) Filed: May 12, 2000

(30) Foreign Application Priority Data

May 20, 1999  (JP) ............................................ 11-140211

(51) Int. Cl.$^7$ ................................................ G02B 26/08
(52) U.S. Cl. ........................................ 359/224; 359/226
(58) Field of Search .................................. 359/223, 224, 359/226; 173/504.01, 504.04

(56) References Cited

U.S. PATENT DOCUMENTS

| | | |
|---|---|---|
| 4,903,156 A | 2/1990 | Tohru |
| 5,016,072 A  * | 5/1991 | Greiff ........................ 357/26 |
| 5,543,956 A | 8/1996 | Satoru |
| 5,606,447 A | 2/1997 | Nohiro |
| 5,629,790 A | 5/1997 | Neukermans |
| 5,694,237 A | 12/1997 | Melville |
| 5,739,941 A | 4/1998 | Knipe et al. |

FOREIGN PATENT DOCUMENTS

| | | |
|---|---|---|
| JP | 10123449 | 5/1998 |
| JP | 10-123449 | 5/1998 |
| WO | 98 44571 | 10/1998 |

* cited by examiner

*Primary Examiner*—Cassandra Spyrou
*Assistant Examiner*—Euncha Cherry
(74) *Attorney, Agent, or Firm*—Frishauf, Holtz, Goodman & Chick, P.C.

(57) ABSTRACT

A torsional rocker used in an optical scanner comprises a movable element, a pair of torsion spring structures or elastic members for rockably supporting the movable element, and a stationary element which fixes or holds the torsion spring structures. The movable element includes a coil which surrounds its edges and a mirror inside the coil. The opposite ends of the coil are connected individually to electrode pads on the stationary element by means of wires. The torsion spring structure includes a pair of leaf springs which extend parallel to each other, and the torsion spring structure also includes another pair of leaf springs which extend parallel to each other. The four leaf springs have the same thickness.

20 Claims, 19 Drawing Sheets b4=1.0, 1.2mm $b5 = 1.0, 1.2mm$

TORSIONAL ROCKER

CROSS-REFERENCE TO RELATED APPLICATIONS

This application is based upon and claims the benefit of priority from the prior Japanese Patent Application No. 11-140211, filed May 20, 1999, the entire contents of which are incorporated herein by reference.

BACKGROUND OF THE INVENTION

The present invention relates to a torsional rocker used in an optical scanner, angular acceleration sensor, etc.

A torsional rocker, which is manufactured by a semiconductor manufacturing process, for example, comprises a movable element which is supported by means of a torsion spring structure or elastic member. An optical scanner that utilizes a torsional rocker of this type is described in Jpn. Pat. Appln. KOKAI Publication No. 10-123449. FIG. 32 shows an outline of this optical scanner.

The optical scanner comprises a movable element 12, a pair of torsion spring structures or elastic members 16 and 18 for rockably supporting the movable element 12, and a stationary element 14 for fixing the structures 16 and 18. Each of the torsion spring structures 16 and 18 is composed of one leaf spring, and the movable element 12 includes a coil 20. These elements are formed integrally with one another by utilizing the semiconductor manufacturing process. On either side of the movable element 12, two permanent magnets 22 and 24 are symmetrically fixed to the stationary element 14 by adhesive bonding.

As current is applied to the coil 20, it produces Lorentz force in a magnetic field which is formed by means of the permanent magnets, whereupon the movable element 12 rocks around the leaf springs 16 and 18. A mirror is formed on the back surface of the movable element 12 (opposite from the surface on which the coil 20 is formed), and a light beam that is reflected by the mirror is scanned as the movable element 12 rocks.

In order to improve the scanning speed of the optical scanner of this construction, it is necessary to increase the stiffness of the leaf springs which support the movable element 12. If the width, thickness, and length of each leaf spring are w, t, and l, respectively, the torsional stiffness of the spring is proportional to $wt^3/l$. Accordingly, the stiffness of the elastic members can be improved by increasing the width or thickness of each spring or reducing the length.

Although the stiffness of the elastic members can be improved most effectively by increasing the thickness of each spring, a thick film cannot be formed with ease in the semiconductor manufacturing process. If a thick film can be formed, moreover, a substantial residual stress is often generated in the film, possibly exerting a bad influence upon the flatness of the mirror which is formed on the rockably movable element 12.

If the length is reduced, on the other hand, stress generated in the leaf springs increases as the springs undergo torsional deformation that is caused by the same torque. If the stress exceeds a given value, the springs may be broken. Accordingly, the leaf springs cannot be made very short. Actually, therefore, the stiffness of the leaf springs can be increased only by increasing the width.

If the width of the leaf springs is increased, however, tensile stress is generated in portions that are distant from the swing axis of the torsional deformation. Accordingly, the external torque-torsional angle characteristic of the leaf springs inevitably becomes non-linear. Since the stiffness increases as the torsional angle widens, therefore, a desired torsional angle cannot be obtained. If the non-linear leaf springs are resonated, moreover, the resulting frequency components include components of frequencies that are equal to integer multiples of the resonance frequency, so that unnecessary high-order resonance may possibly be caused.

BRIEF SUMMARY OF THE INVENTION

The object of the present invention is to provide a torsional rocker, in which the stiffness of torsion spring structures is improved and the non-linearity of the torque-torsional angle characteristic of the spring structures is restrained.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

First Embodiment

An optical scanner using a torsional rocker according to a first embodiment of the present invention will now be described with reference to the accompanying drawings.

Figure 3:
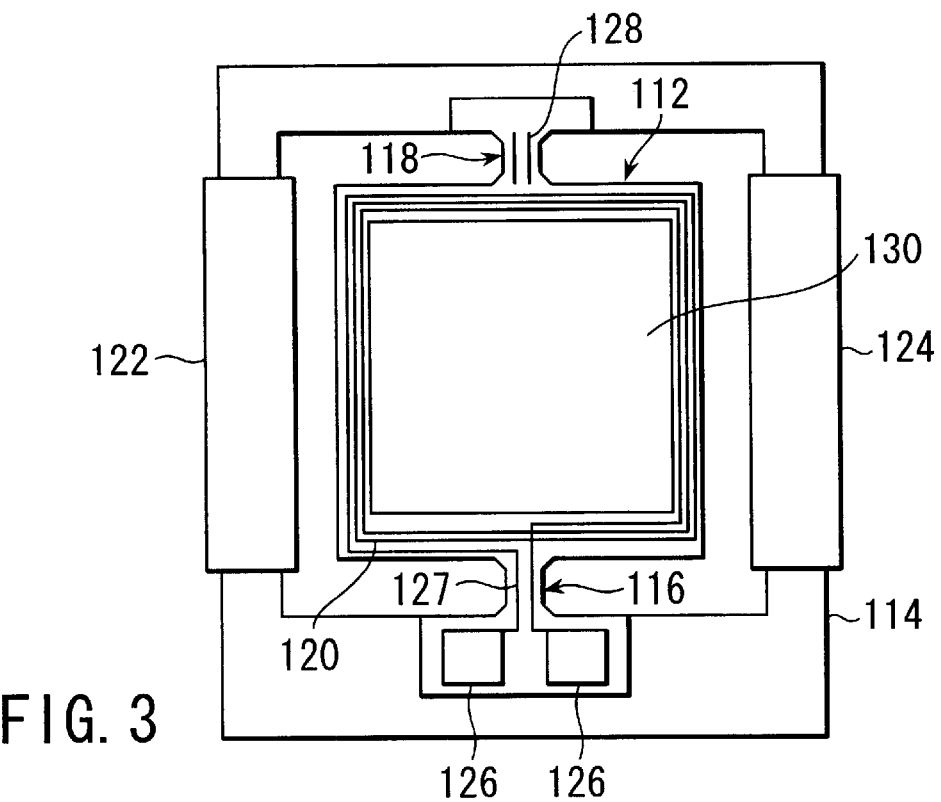
FIG. 3 is a plan view of the optical scanner using the torsional rocker according to the first embodiment.

As shown in FIG. 3, the optical scanner using the torsional rocker according to the present embodiment comprises a movable element 112, a pair of torsion spring structures or elastic members 116 and 118 which rockably support the movable element 112 at both of opposite ends, and a stationary element 114 which fixes or holds the structures 116 and 118. The movable element 112 includes a coil 120, which surrounds its edges, and a mirror 130 inside the coil 120. The opposite ends of the coil 120 are connected individually to electrode pads 126 on the stationary element 114 through wires 127. On the opposite sides of the movable element 112, two permanent magnets 122 and 124, which extend parallel to the respective axes of the torsion spring structures 116 and 118, are fixed to the stationary element 114 by adhesive bonding.

Figure 1:
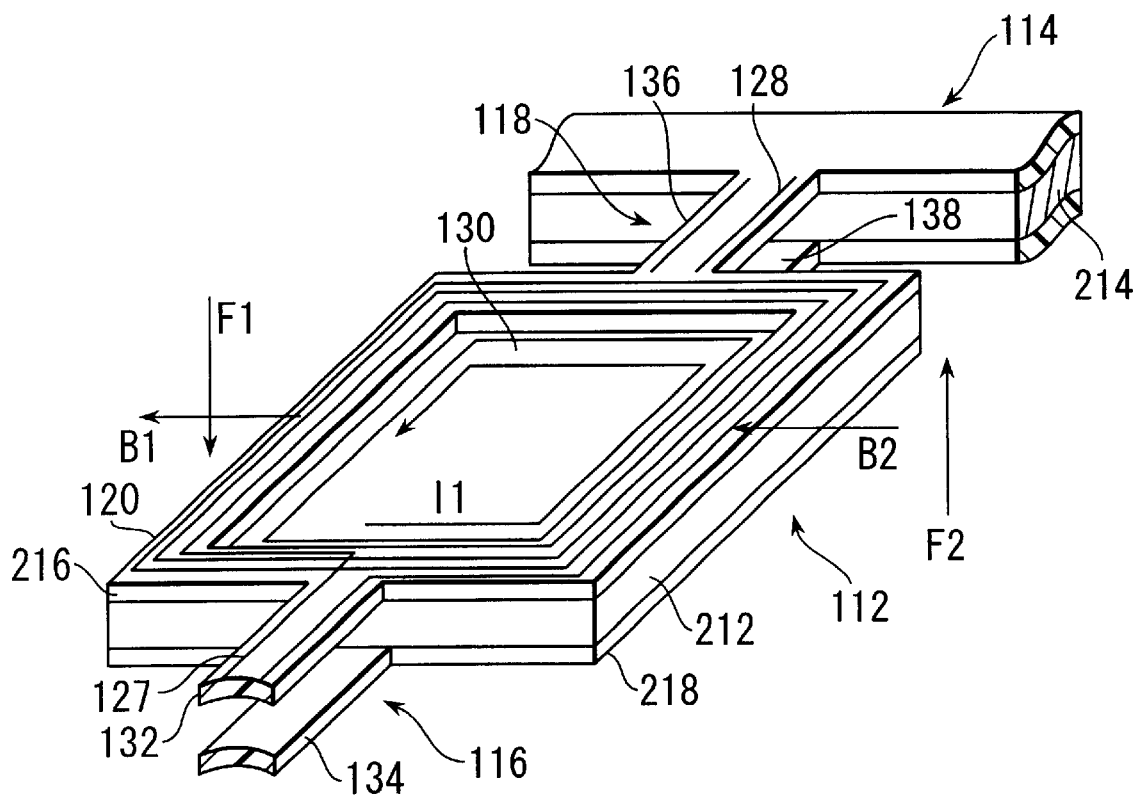
FIG. 1 is a perspective view of a part of an optical scanner using atorsional rocker according to a first embodiment of the present invention.

As shown in FIG. 1, the torsion spring structure 116 includes a pair of leaf springs 132 and 134 which extend parallel to each other, and the torsion spring structure 118 includes a pair of leaf springs 136 and 138 which extend parallel to each other. The four leaf springs 132, 134, 136 and 138 have the same thickness.

The movable element 112 comprises a laminate structure, which includes a rectangular silicon substrate 212 and polyimide films 216 and 218 formed individually on the upper and lower surfaces thereof. The stationary element 114 comprises a laminate structure, which includes a silicon substrate 214 surrounding the substrate 212 and the polyimide films 216 and 218 formed individually on the upper and lower surfaces thereof. The four leaf springs 132, 134, 136 and 138 comprise portions of the polyimide films 216 and 218 that extend between the silicon substrate 214 and the silicon substrate 216.

Figure 2:
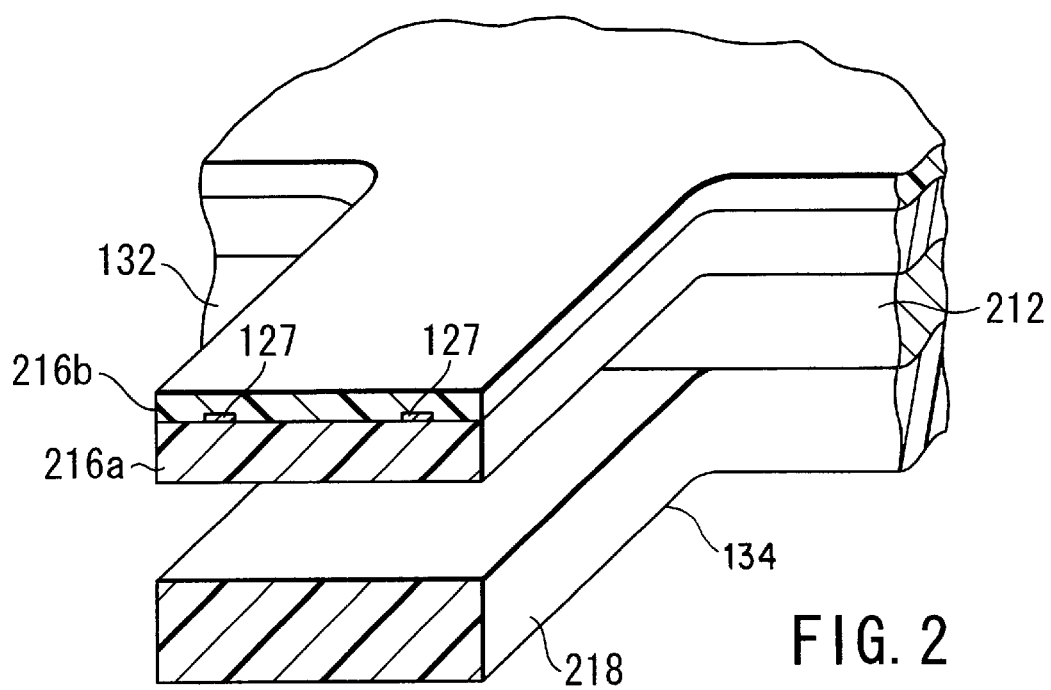
FIG. 2 is an enlarged view, partially in section, showing a torsion spring structure shown in FIG. 1.

As shown in FIG. 2, the polyimide film 216 comprises a two-layer structure, which includes first and second polyimide layers 216a and 216b. The wires 217 extend between the first and second polyimide layers 216a and 216b that constitute the leaf spring 132, while dummy wires 128 extend between the first and second polyimide layers 216a and 216b that constitute the leaf spring 136, which is located symmetrically to the leaf spring 132. The dummy wires 128 are provided only to equalize the spring characteristics of the leaf springs 132 and 136, and are not electrically in contact with any other elements.

The following is a description of the operation of the optical scanner. In FIG. 1, a magnetic field, which is generated by means of the permanent magnets 122 and 124 (see FIG. 3), extends across the coil on the movable element. Components of the magnetic field that are indicated by arrows B1 and B2 generate a torque which causes the movable element 112 to rock. When a current in the direction indicated by arrow I1 flows through the coil 120, for example, Lorentz forces are produced in the directions indicated by arrows F1 and F2, corresponding to the magnetic field components B1 and B2, respectively.

Figure 4:
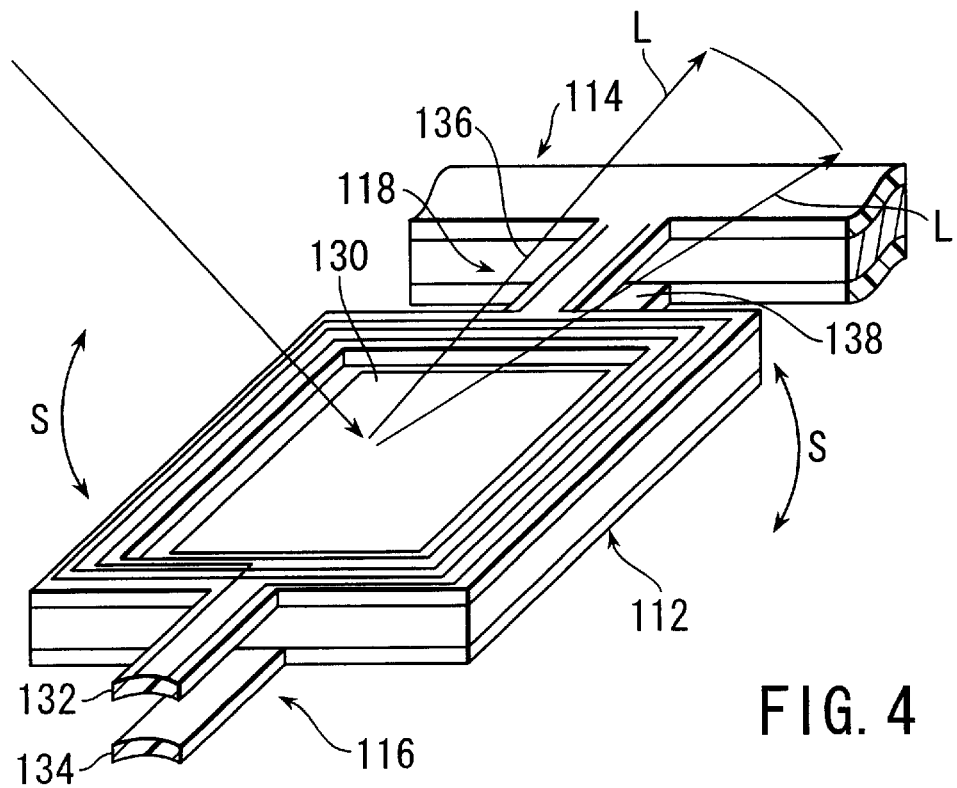
FIG. 4 is a view showing the way a light beam is scanned by means of the optical scanner shown in FIG. 1.

Thus, the movable element 112 is rocked around a swing axis, which extends substantially halfway between the paired leaf springs 132 and 134 which constitute the torsion spring structure 116 and between the paired leaf springs 136 and 138 which constitute the torsion spring structure 118, as indicated by arrow S in FIG. 4. As the movable element 112 is rocked in this manner, a light beam L that is reflected by the mirror 130 in the central portion of the element 112 is scanned.

The following is a description of the properties of the torsional rocker of the present embodiment. Let it be supposed that leaf springs of two different widths, wide and narrow, are used as the leaf springs that constitute each torsion spring structure. Both the wide and narrow leaf springs are 2.0 mm long and 32.9 µm thick. The wide and narrow springs have widths of 3.2 mm and 0.4 mm, respectively. The length of each leaf spring is a dimension parallel to the swing axis and equal to the distance between the movable element 112 and the stationary element 114. The thickness of each leaf spring is a dimension normal to its opposite surface and equal to the thickness of the polyimide layer 216 or 218. The width of each leaf spring is a dimension perpendicular to its length and thickness.

In the torsional rocker of the present embodiment, the distance between the respective opposite surfaces of the paired leaf springs is adjusted to 300 µm, which is shorter than the width, 3.2 mm or 0.4 mm, of each spring. This is done because stiffness can be obtained more easily by increasing the width of each leaf spring than by increasing the distance between the springs in a manufacturing method that utilizes a semiconductor manufacturing process. This configuration facilitates the manufacture of a torsional rocker that concurrently ensures improved stiffness and suppression of non-linearity.

Figure 5:
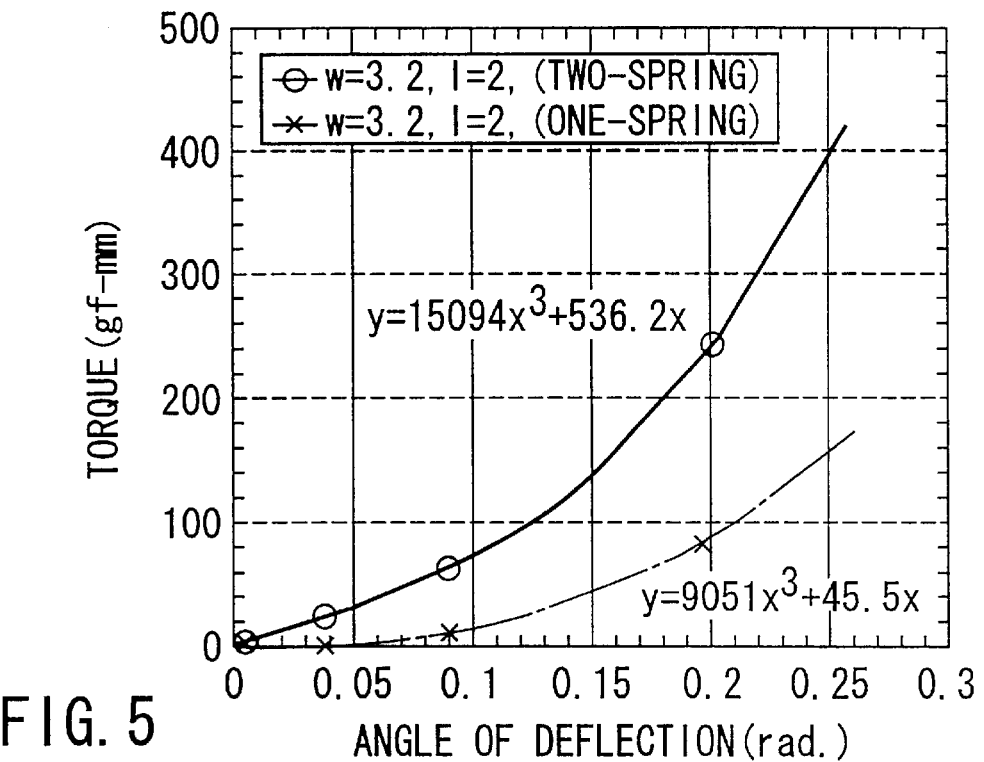
FIG. 5 is a graph showing the result of simulation of the external torque-torsional angle characteristic of a pair of torsion spring structures, each of the structures comprising a pair of wide leaf springs.

FIG. 5 shows the result of simulation of the external torque-torsional angle characteristic of a pair of torsion spring structures, each of the structures comprising a pair of wide leaf springs. For comparison, FIG. 5 also shows the same characteristic of a pair of torsion spring structures, each of the structures being composed of one wide leaf spring. It is hard sensuously to compare the wide leaf springs shown in FIG. 5. Therefore, FIG. 5 shows cubic functions for the characteristics that are obtained from cubic equations and adjusted to odd functions.

Since cubic and linear coefficients are believed to represent non-linearity and linearity, respectively, the non-linearity can be evaluated by calculating the ratio between them. In the torsion spring structure composed of one leaf spring, the ratio between the cubic and linear coefficients is 9,051/45.5=199. In the torsion spring structure composed of a pair of leaf springs, the ratio between the cubic and linear coefficients is 15,904/536.2=29.7. Thus, it is evident that the non-linearity is suppressed, that is, the linearity is improved.

Figure 6:
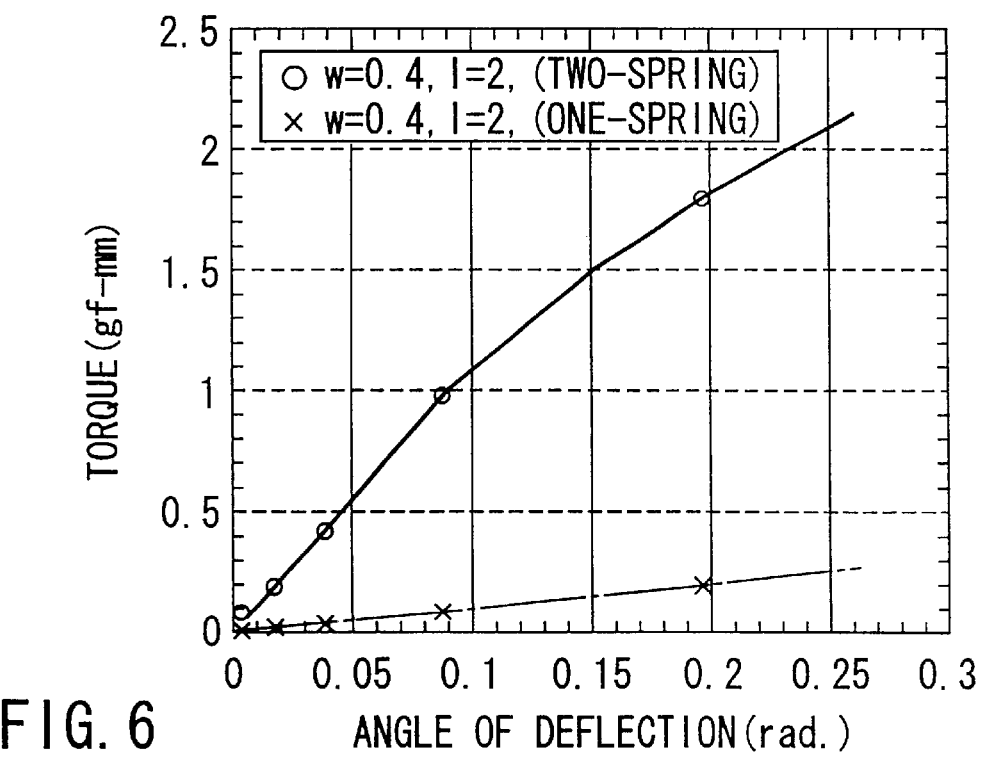
FIG. 6 is a graph showing the result of simulation of the external torque-torsional angle characteristic of a pair of torsion spring structures, each of the structures comprising a pair of narrow leaf springs.

FIG. 6 shows the result of simulation of the external torque-torsional angle characteristic of a pair of torsion spring structures, each of the structures comprising a pair of narrow leaf springs. FIG. 6, like FIG. 5, also shows the same characteristic of a pair of torsion spring structures, each of the structures being composed of one narrow leaf spring.

In the case of the torsion spring structure that is composed of one leaf spring as in the conventional case, the external torque-torsional angle characteristic is substantially linear if the leaf spring is narrow (0.4 mm wide), as seen from FIGS. 5 and 6. If the leaf spring is a wide one (3.2 mm wide), the linearity is lowered considerably, and the larger the torsional angle, the higher the spring stiffness is. This characteristic is referred to as "downwardly convex non-linearity" herein. Thus, simply increasing the width of each spring enhances the stiffness, and on the other hand, causes downwardly convex non-linearity. This is the problem that has been described in connection with the prior art.

On the other hand, the respective external torquetorsional angle characteristics of the pair of torsion spring structures (distance between leaf springs: 0.3 mm) of the present invention, each of the structures comprising a pair of leaf springs, and the pair of conventional torsion spring structures, each of the structures being composed of one leaf spring, are compared. As shown in FIG. 6, the comparison specifies opposite non-linearity such that the larger the torsional angle, the lower the spring stiffness is. This characteristic is referred to as "upwardly convex non-linearity" herein.

As shown in both FIGS. 5 and 6, the spring stiffness of the torsion spring structure that comprises a pair of leaf springs is twice or more higher. This effect is better than one that can be usually expected when the number of leaf springs used is simply increased to two.

As is evident from the above description, the torsion spring structure comprising a pair of leaf springs which are spaced in the thickness direction, when compared with the torsion spring structure composed of one leaf spring, displays "upwardly convex non-linearity." If each leaf spring is wide, in particular, the "downwardly convex non-linearity" of the torsion spring structure composed of one leaf spring is canceled by the "upwardly convex non-linearity" which is attributable to the increase of the number of leaf springs to two, so that non-linearity is suppressed. The torsion spring structure comprising a pair of leaf springs, compared with the torsion spring structure composed of one leaf spring, is greatly improved in stiffness. It is evident, therefore, that the torsion spring structure comprising a pair of leaf springs is an effective measure to reconcile the improvement in stiffness and the suppression of non-linearity.

Figures 7A, 7B:
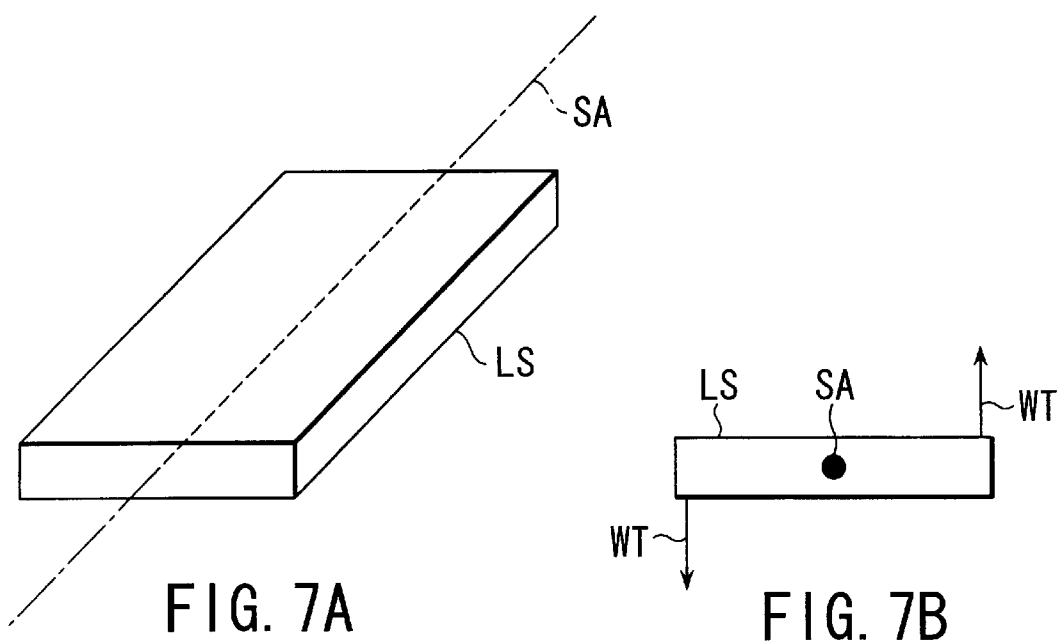
FIG. 7A schematically shows a torsion spring structure composed of one leaf spring.
FIG. 7B schematically shows a force that acts on the leaf spring when the torsion spring structure is twisted.
Figures 8A, 8B:
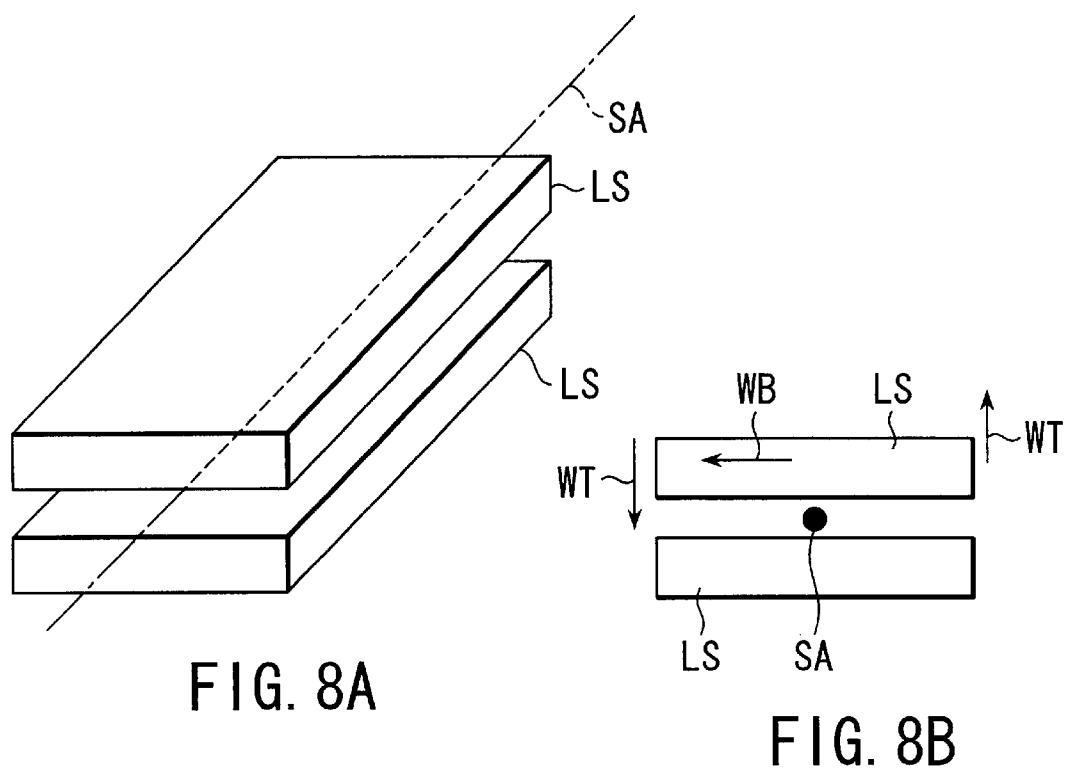
FIG. 8A schematically shows a torsion spring structure composed of a pair of leaf springs.
FIG. 8B schematically shows a force that acts on the leaf springs when the torsion spring structure is twisted.

Referring now to FIGS. 7A, 7B, 8A and 8B, there will be described the reason why the torsion spring structure comprising a pair of leaf springs can obtain the aforesaid "upwardly convex non-linearity." FIG. 7A schematically shows the torsion spring structure composed of one leaf spring, and FIG. 7B schematically shows a force which acts on the leaf spring when this torsion spring structure is twisted. Likewise, FIG. 8A schematically shows the torsion spring structure comprising a pair of leaf springs, and FIG. 8B schematically shows a force which acts on the leaf springs when this torsion spring structure is twisted.

In the torsion spring structure composed of one leaf spring LS, as shown in FIG. 7B, a swing axis SA extends through the leaf spring LS, which is subjected to a torsional load WT substantially purely. In the torsion spring structure comprising a pair of leaf springs LS, as shown in FIG. 8B, on the other hand, a swing axis SA is situated off the leaf springs LS, so that a bending load WB, compared with the torsional load WT, heavily acts to subject the leaf springs LS to in-surface deformation in an initial stage of torsion such that the torsional angle is infinitesimal.

If the width, thickness, and length of each leaf spring are w, t, and l, respectively, the bending stiffness of the spring is proportional to $w^3 t/l$ (direction of w is the bending direction), in general. It can be supposed, therefore, that the leaf spring is urged to be deformed in the direction for the highest stiffness in the initial stage of torsion. As the torsional angle increases, thereafter, the torsional load WT becomes more dominant than the bending load WB, so that the stiffness of the leaf spring can be supposed to lower gradually. Thus, with the torsion spring structure comprising a pair of leaf springs, the reason for the manifestation of the "upwardly convex non-linearity" can be explained.

Figure 9A:
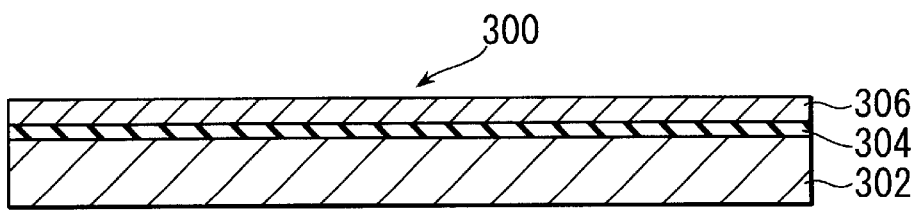
FIGS. 9A to 9I show manufacturing processes for the torsional rocker according to the first embodiment.

The torsional rocker used according to the present embodiment can be manufactured by utilizing the semiconductor manufacturing process. The following is a description of an example of a manufacturing method. Referring first to FIG. 9A, an SOI (silicon-on-insulator) substrate 300 is prepared as a start wafer. The SOI substrate 300 includes a silicon base 302 referred as handle wafer with a thickness of, e.g., 300 to 500 µm, a silicon oxide film 304 of insulator with a thickness of about 1 μm on one surface of the base 302, and a single crystal silicon layer 306 referred as device layer with a thickness of about 30 μm on the surface of the film 304. A silicon nitride film (not shown) is formed on each side of the SOI substrate 300 by a method called LPCVD (low-pressure chemical vapor deposition). A mask for dividing the handle wafer 302 between a movable element and a stationary element is patterned on the silicon nitride film on the reverse side.

Figure 9B:
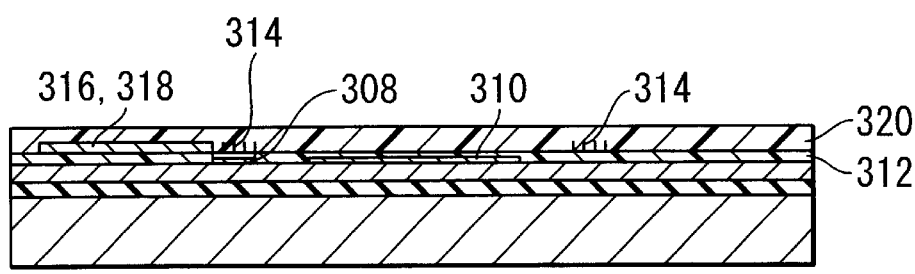

As shown in FIG. 9B, aluminum or some other metal is used to form an outgoing line 308, which is led out from the inner end portion of the coil to the elastic member (torsion spring structure or leaf spring), and a mirror 310 on an insulating film of the silicon nitride film on the obverse side. Further, a first polyimide layer 312 is formed, and a contact hole (not shown) is formed penetrating the layer 312. Then, aluminum or some other metal is used again to form on the first polyimide layer 312 a coil 314, interlayer wiring (not shown), connecting wires 316 passing through the elastic member and connecting the stationary and movable elements, and electrode pads 318 which serve as portions for connection with external wiring. Thereafter, a second polyimide layer 320 is formed, and a protective film is formed to protect the coil 314 and the wires 316 from the atmosphere.

Figure 9C:
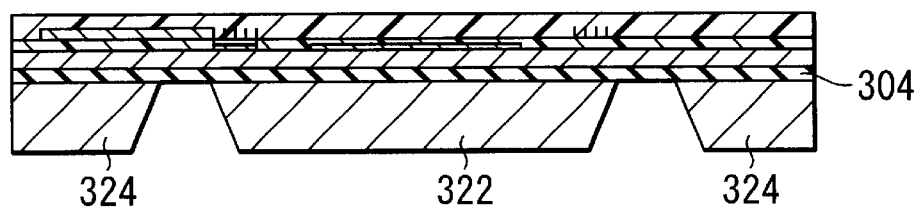

As shown in FIG. 9C, the silicon base 302 as the handle wafer is subjected to wet etching to form a movable element 322 and a stationary element 324, using the patterned silicon nitride film, formed on the reverse side in the process of FIG. 9A, as a mask. Since this etching utilizes the anisotropy of the crystal of silicon, the respective side faces of the elements 322 and 324 are slopes. If the handle wafer 302 is penetrated, the silicon oxide film 304, an insulator, appears. The film 304 serves as an etching stop layer, which substantially stops the progress of the etching. Thereafter, the silicon nitride film which is used as the mask is removed.

Figure 9D:
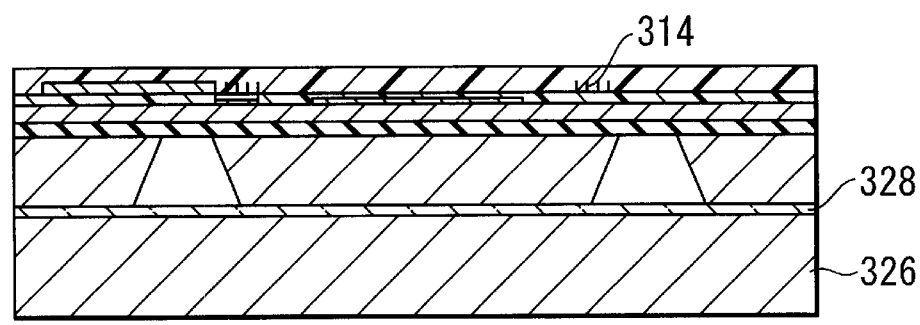

As shown in FIG. 9D, moreover, a silicon substrate 326 of the same quality as the device layer 306 of the SOI substrate 300 is bonded to the silicon base 302 as the handle wafer. Since the polyimide layers 312 and 320 are already formed on the SOI substrate 300, low-temperature bonding using low-melting glass or the like is utilized. Thus, a low-melting glass layer 328 to serve as a bonding layer is formed on the joint surface of the silicon substrate.

Figure 9E:
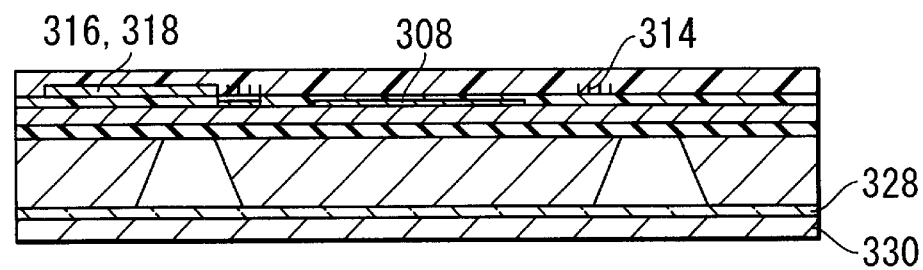

After the bonding, as shown in FIG. 9E, the silicon substrate 326 is polished to the same thickness as the device layer 306 by a machining process, such as lapping or polishing, or CMP (chemical mechanical polishing). The resulting work surface is expected to be a mirror surface.

Figure 9F:
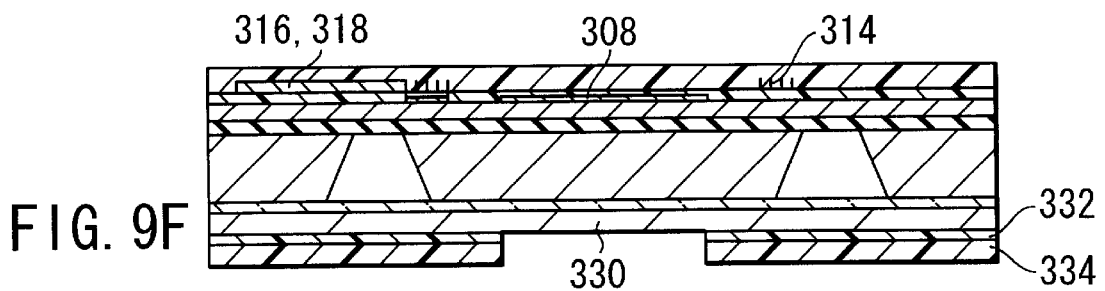

A silicon oxide film (not shown) is formed on the polished surface of a silicon substrate 330 by a low-temperature film-forming method such as plasma CVD, and a reverse polyimide layers 332 and 334 are formed on the silicon oxide film, as shown in FIG. 9F. Although the reverse polyimide layers are denoted individually by two reference numerals 332 and 334 and shown to be components of a two-layer structure, a single layer may be formed in one process, instead.

After the film formation, the reverse polyimide layers 332 and 334 are patterned individually into given shapes by RIE (reactive ion etching) so that all the regions except portions corresponding to the leaf springs and portions around junctions to the stationary and movable elements are removed. Although the reverse polyimide layers 332 and 334 should preferably be formed having the same thickness as the polyimide layers 312 and 320 on the obverse side, it is not essential.

Figure 9G:
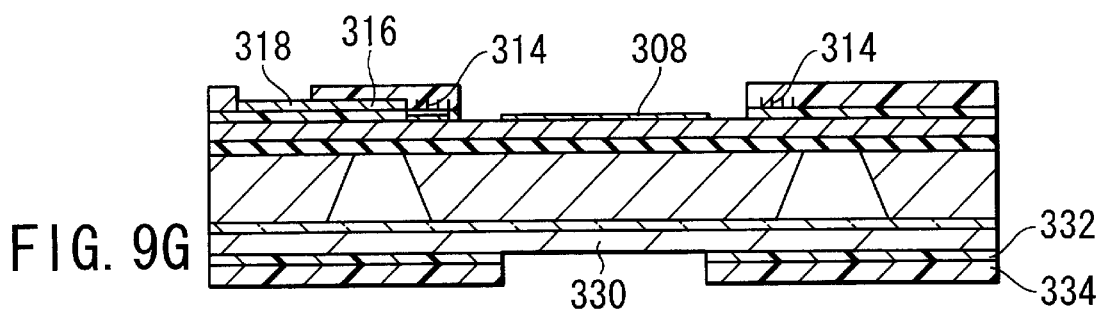

As shown in FIG. 9G, the obverse polyimide layers 312 and 320 are patterned individually into given shapes by RIE so that all the regions except portions corresponding to the leaf springs, portions around junctions to the stationary and movable elements, and portions that protect the coil 314, wires 316, etc. are removed.

Figure 9H:
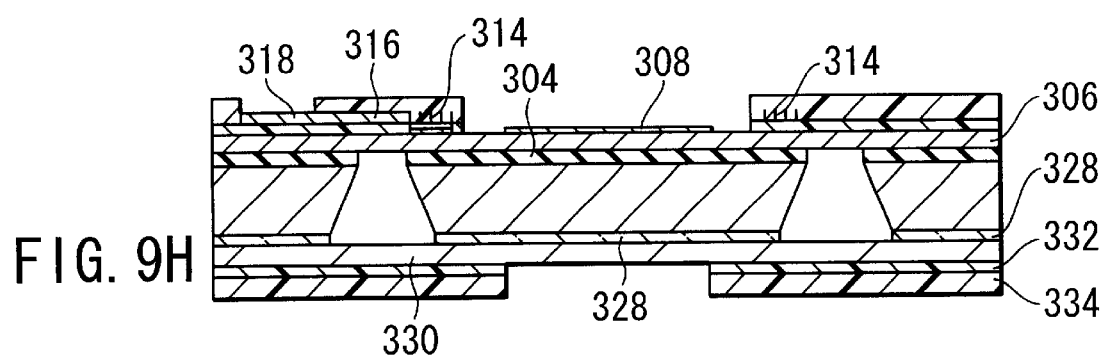

As shown in FIG. 9H, the silicon nitride film formed on the device layer 306 on the obverse side in the process of FIG. 9A and the silicon oxide film formed on the substrate 330 on the reverse side in the process of FIG. 9F are removed by isotropic dry processing so that their shapes resemble those of the movable element, stationary element, and leaf springs, individually.

Figure 9I:
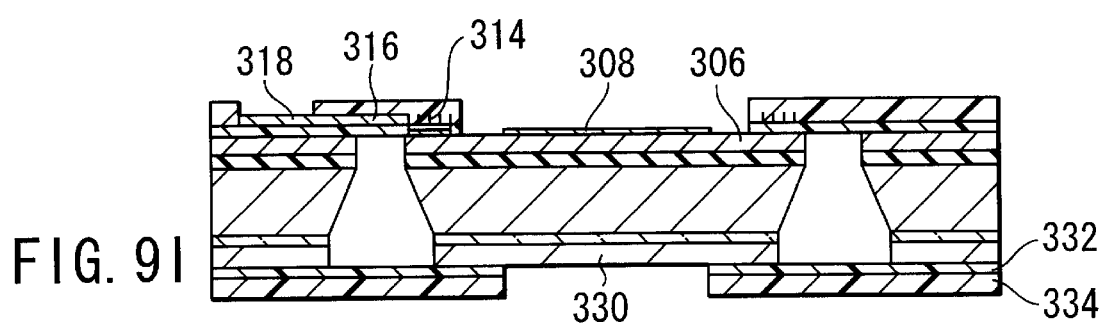

As shown in FIG. 9I, the thin single-crystal silicon films (the device layer 306 of the SOI substrate 300 and the polished silicon substrate 330) remaining individually on the reverse side of the obverse leaf spring portion and the obverse side of the reverse leaf spring portion are removed by isotropic dry processing using xenon difluoride or the like.

In this process, the single-crystal silicon films 306 and 330 are etched isotropically, so that undercutting is caused against the shape of a mask formed in the process of FIG. 9H. It is to be desired, therefore, that patterning in the process of FIG. 9H should be carried out for a shape which previously involves the undercut portion. Since portions masked with torsion bars are also subjected to undercutting, on the other hand, the silicon film in these portions can be entirely removed to leave only polyimide torsion bars. Thereafter, the oxide film on the device layer interface and joint interface is removed by wet etching, whereupon only the polyimide layers remain on the leaf spring portions so that the torsional rocker is completed.

According to the present embodiment, the torsion spring structure comprises a pair of leaf springs which are arranged at a distance equal to the thickness of the movable element, so that it is higher in stiffness than the conventional torsion spring structure which is composed of one leaf spring and is constrained in spring non-linearity. Thus, the optical scanner of the present embodiment has the torsion spring structures that enjoy high linearity and stiffness, so that it can perform high-speed scanning with good controllability.

In the manufacturing method described with reference to FIGS. 9A to 9I, the respective side faces of the movable element 322 and the stationary 324 are inevitably tapered, so that the leaf springs on the obverse and reverse sides are different in length. The difference in length between the leaf springs, which depends on the thickness of the handle wafer 302, is 0.4 mm if the thickness is 300 μm, for example. In the case where this difference cannot be ignored, it is advisable to employ the following method, which will be described with reference to FIGS. 10A to 10E.

Figure 10A:
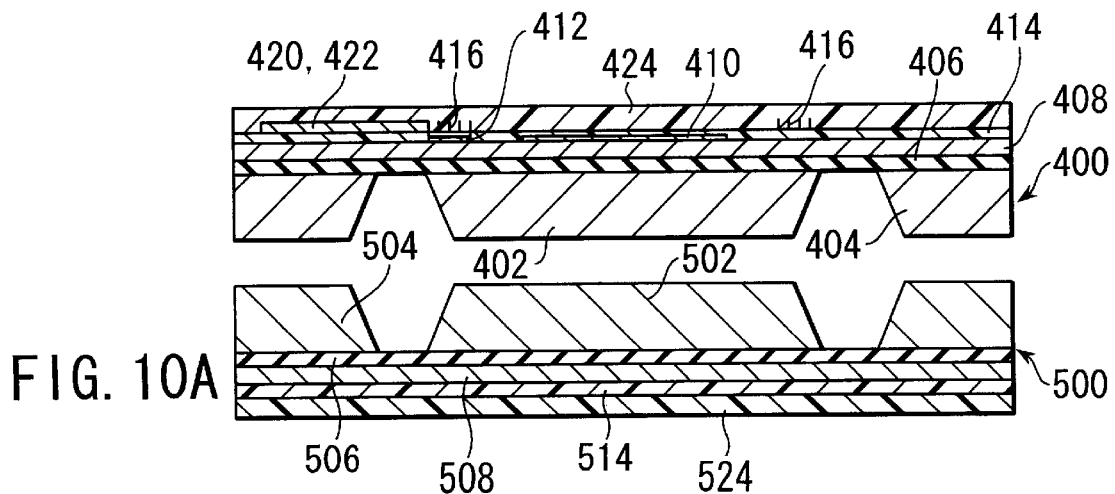
FIGS. 10A to 10E show alternative manufacturing processes for the torsional rocker according to the first embodiment.

As shown in FIG. 10A, first and second SOI substrates 400 and 500 are prepared. The first SOI substrate 400 is a laminate structure which is obtained in the processes of FIGS. 9A to 9C. The second SOI substrate 500 is a laminate structure which is obtained by omitting a coil, wires, and mirror from the first SOI substrate 400. This structure can be obtained by omitting processes for making the coil, wires, mirror, etc. from aluminum or some other metal, from the processes for manufacturing the first SOI substrate 400.

Thus, the first SOI substrate 400 includes a movable element 402 and a stationary element 404 obtained by etching a silicon substrate, a silicon oxide film 406 and a single-crystal silicon layer 408 stacked in succession over the elements 402 and 404, and a mirror 410 and an outgoing line 412 formed over the layer 408. The substrate 400 further includes a first polyimide layer 414 covering the mirror 410 and the line 412, a coil 416, wires 420, and electrode pads 422 formed on the layer 414, and a second polyimide layer 424 covering these elements.

Further, the second SOI substrate 500 includes a movable element 502 and a stationary element 504 obtained by etching a silicon substrate, and a silicon oxide film 506, single-crystal silicon layer 508, first polyimide layer 514, and second polyimide layer 524, which are stacked in succession over the elements 502 and 504.

Figure 10B:
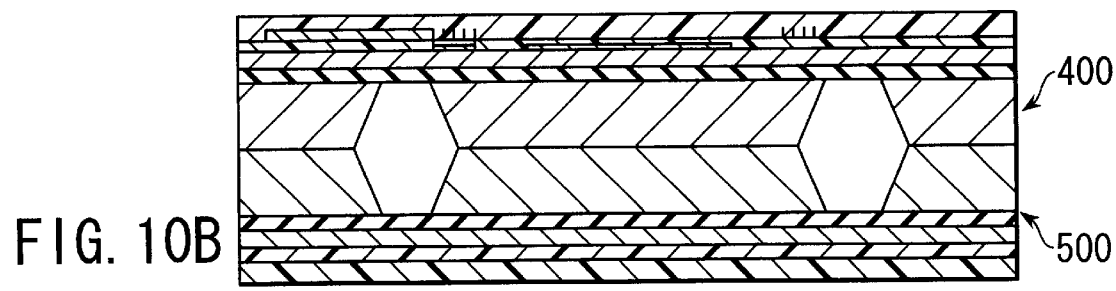

As shown in FIG. 10B, the first and second SOI substrates 400 and 500 are bonded together. In this case, as in the case of the foregoing manufacturing method, it is advisable to employ a low-temperature bonding technique.

Figure 10C:
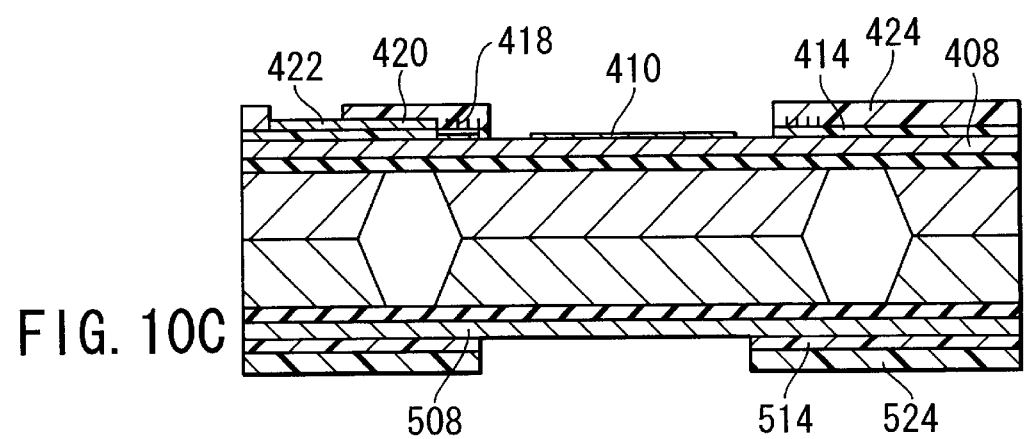

As shown in FIG. 10C, the first and second polyimide layers 414 and 424 are patterned individually into given shapes by RIE so that all the regions except portions corresponding to the leaf springs, portions around junctions to the movable and stationary elements 402 and 404, and portions that protect the coil 418 and the wires 420 are removed. Further, the first and second polyimide layers 514 and 524 are patterned individually into given shapes by RIE so that all the regions except portions corresponding to the leaf springs and portions around junctions to the movable and stationary elements 502 and 504 are removed.

Figure 10D:
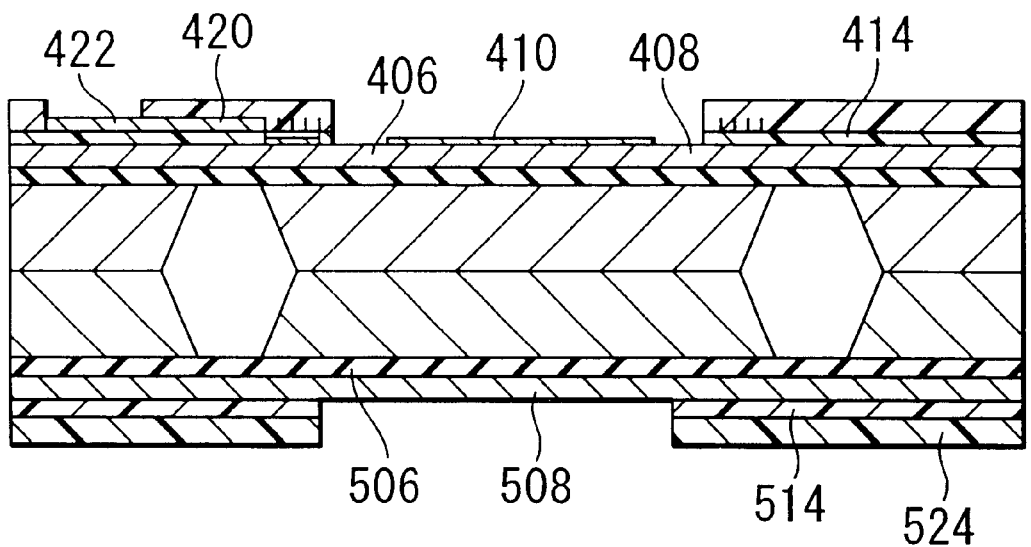

As shown in FIG. 10D, silicon nitride films (not shown) which are formed individually on interfaces between the device layers 408 and 508 and the polyimide layers 414 and 514 are removed by isotropic dry processing so that their shapes resemble those of the movable element, stationary element, and leaf springs, individually.

Figure 10E:
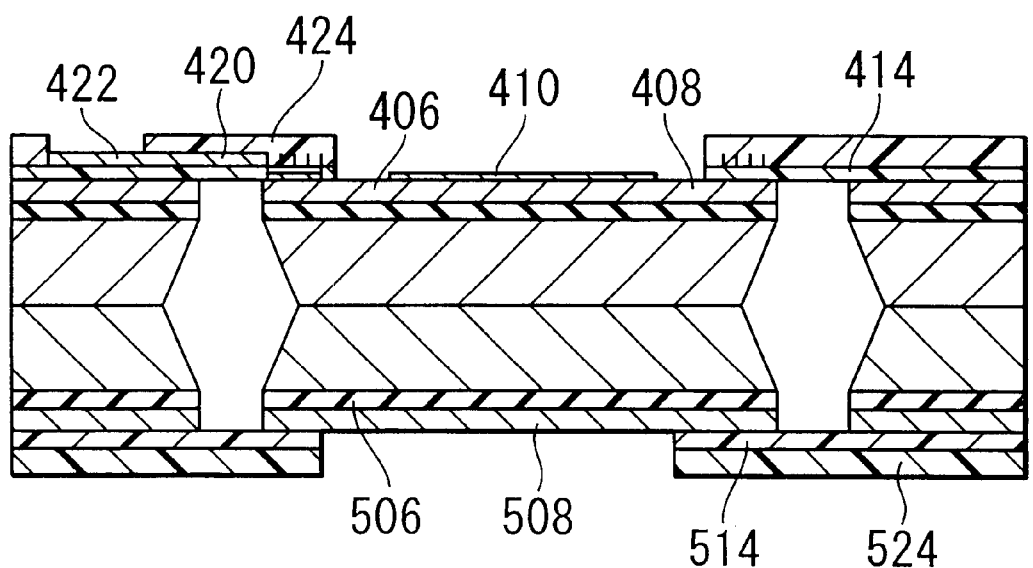

As shown in FIG. 10E, the thin single-crystal silicon films 408 and 508 remaining on the reverse side of the obverse leaf spring and the obverse side of the reverse leaf spring, respectively, are subjected to isotropic dry etching with xenon difluoride. Thereafter, the silicon oxide film on the device layer interface is removed by wet etching, whereupon only the polyimide layers remain on the leaf spring portions so that the torsional rocker is completed.

According to this manufacturing method, the paired leaf springs which constitute each torsion spring structure can be formed having the same shape, so that the swing axis of the spring structure can be accurately settled to ensure more accurate motion.

The configuration of the embodiment described above may be changed or modified variously. Although polyimide is used as the leaf spring material in the torsional rocker described herein, for example, the material is not limited to polyimide. Further, the substrate material is not limited to silicon. For example, poly-silicon, silicon oxide, or silicon nitride film may be used as the spring material, and quartz or the like may be used for the substrate. However, care must be taken in combining these materials, and it is essential that only the substrate can be selectively etched without damaging the spring material, at the least.

If only those materials which resist high-temperature processes can be used, moreover, a high-temperature process such as melt bonding can be used for substrate bonding. The process sequence can be changed without changing the material. By forming the polyimide layers and coil patterns after bonding wafers together, moreover, a high-temperature process such as melt bonding can be used for substrate bonding. Further, the same structure can be manufactured by joining filmy materials instead of forming the polyimide layers on the substrates.

Although an electromagnetic actuator which includes a permanent magnet and a coil is used as a drive mechanism for the optical scanner of the present embodiment, moreover, an electromagnet may be used in place of the permanent magnet. Alternatively, the permanent magnet may be replaced with a actuator based on another principle, e.g., an electrostatic actuator shown in FIG. 11. The electrostatic actuator, which generally requires high driving voltage, must only be provided with an external electrode and requires no permanent magnet. Therefore, the electrostatic actuator is adapted for use in a small-sized mechanism.

Figure 11:
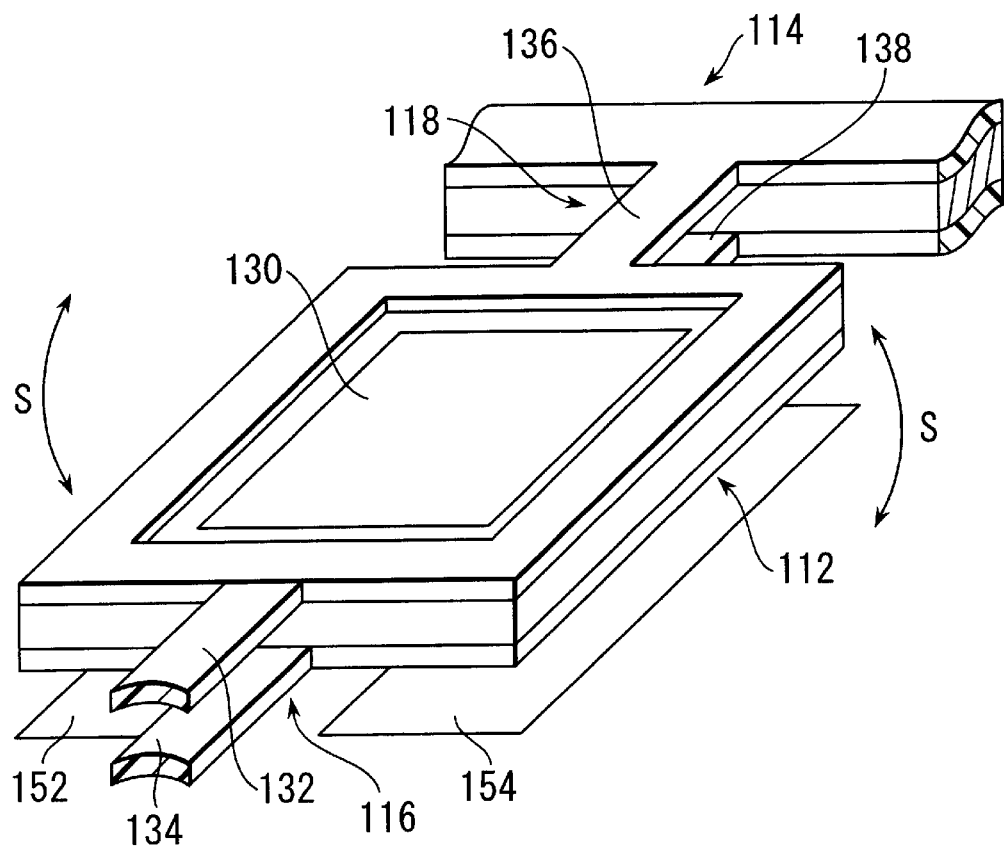
FIG. 11 is a partial perspective view of an optical scanner according to a modification of the first embodiment, using an electrostatic actuator as its drive mechanism.

As shown in FIG. 11, the electrostatic actuator includes a moving electrode (not shown) which is provided on the back surface of the movable element 112 (opposite from the surface on which the mirror 130 is formed) and two stationary electrodes 152 and 154 which are opposed to the moving electrode. When voltage is applied between the one stationary electrode 152 (or 154) and the moving electrode, electrostatic attraction acts between the electrodes, the movable element 112 is twisted in one direction with the torsion spring structures as an axis. When voltage is applied between the other stationary electrode 154 (or 152) and the moving electrode, the movable element 112 is twisted in the opposite direction. Thus, as such voltage application is repeated alternately, the movable element 112 is repeatedly alternately twisted or rocked in opposite directions, as indicated by arrow S. In consequence, the light beam that is reflected by the mirror 130 is scanned as the element 112 rocks.

Figure 12:
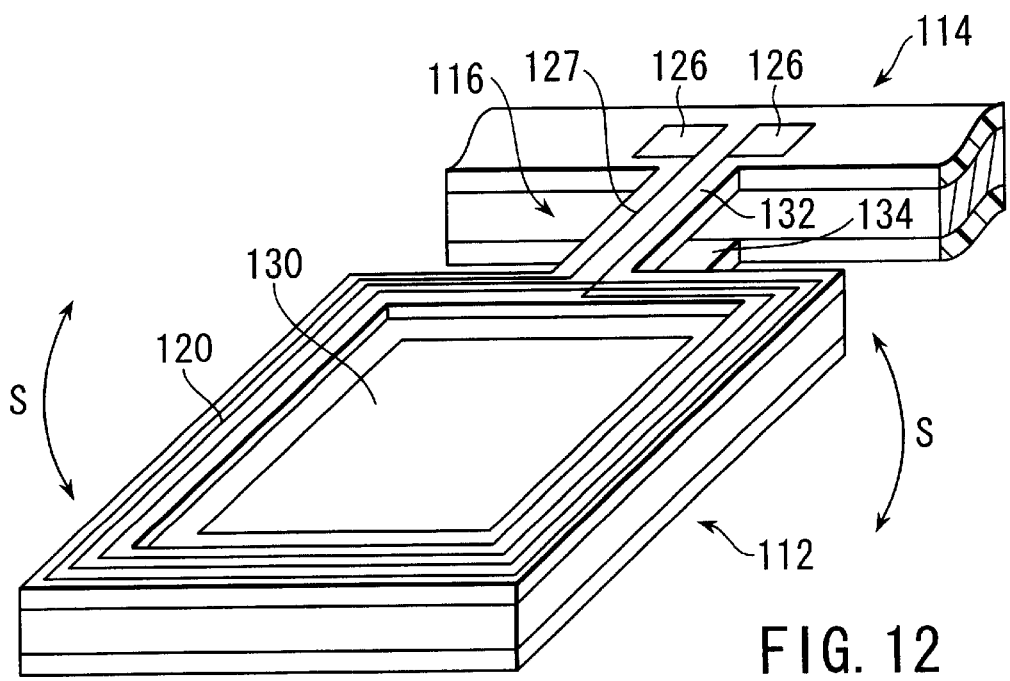
FIG. 12 is a partial perspective view of an optical scanner according to another modification of the first embodiment, having its movable element supported at only one end.

The aforementioned torsional rocker is supported at both of opposite ends by means of the paired torsion spring structures 116 and 118. Alternatively, however, the torsional rocker may be supported at only one end by means of the one torsion spring structure 116, as shown in FIG. 12. In this single-support structure, compared with the double-support structure, the movable element 112 is more susceptible to the influence of the force of gravity. If the swing axis is located parallel to the direction of the gravitational force, however, this influence is substantially negligible. Although the torsional stiffness of the single-support structure is half that of the double-support structure, the single-support structure has freedom of movement in the direction of the swing axis. If the torsional angle is large, therefore, tensile stress that acts on the leaf springs can be lowered, so that the non-linearity can be restrained.

Figure 13:
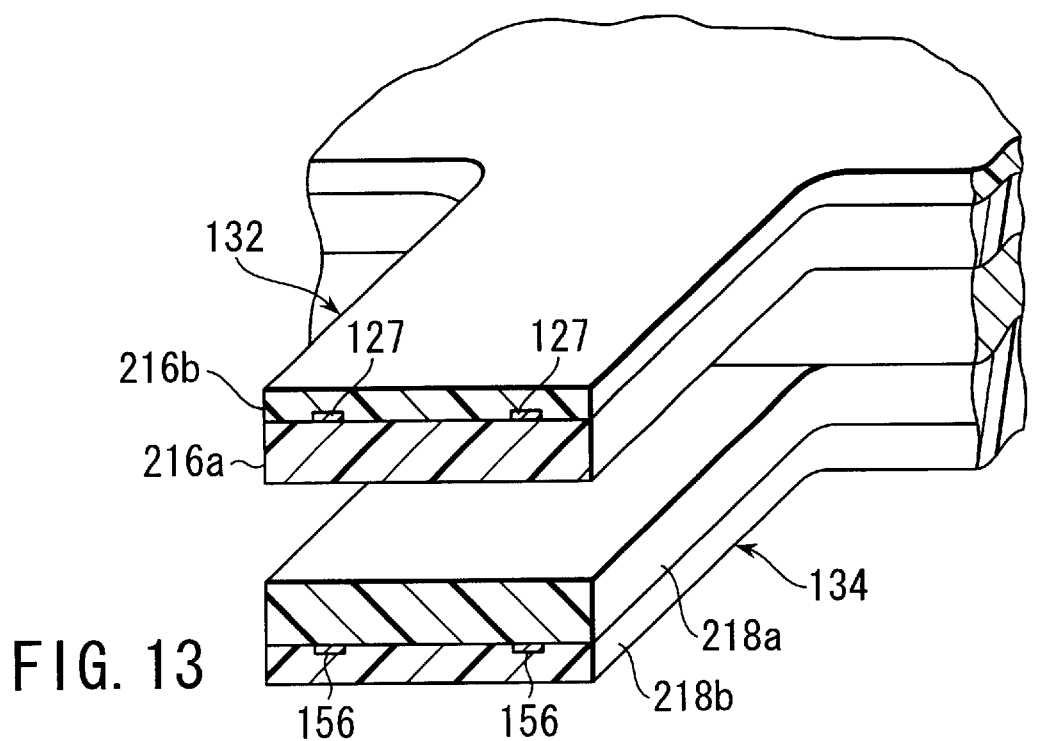
FIG. 13 is an enlarged view, partially in section, showing a modification of the torsion spring structure shown in FIG. 1.

As shown in FIG. 2, moreover, the leaf spring 134 of the torsion spring structure 116 comprises the polyimide layer 218 only. In order to make the respective spring characteristics of the leaf springs 132 and 134 similar, however, the leaf spring 134 may alternatively be provided with first and second polyimide layers 218a and 218b and dummy wires 156 which extends between the layers 218a and 218b, as shown in FIG. 13. The first and second polyimide layers 218a and 218b have the same thicknesses as the first and second polyimide layers 216a and 216b, respectively, and the dummy wires 156 are equivalents of the wires 127.

The leaf spring 134 of this construction may be obtained by inserting a process for forming dummy wires of aluminum or the like between processes for forming the polyimide layers 332 and 334 during the process of FIG. 9F, for example. Alternatively, the leaf spring 134 may be obtained by inserting a process for forming dummy wires of aluminum or the like between processes for forming the polyimide layers 514 and 524 as the second SOI substrate 500 is prepared in the process of FIG. 10A.

Figure 14:
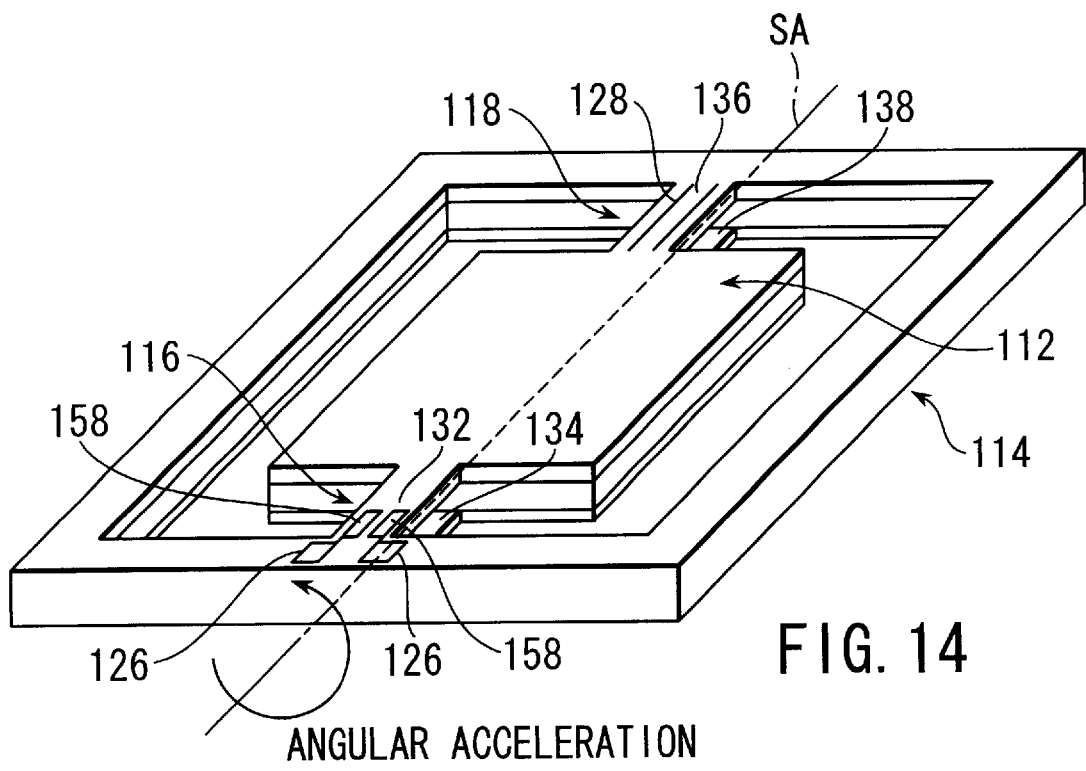
FIG. 14 is a perspective view of an angular acceleration sensor using the torsional rocker according to the first embodiment.

Although the aforementioned embodiment is an example in which the torsional rocker of the present invention is applied to an optical scanner, moreover, the torsional rocker may be applied to any other device. For example, the torsional rocker of the invention may be applied to an angular acceleration sensor. FIG. 14 shows the angular acceleration sensor which uses the torsional rocker of the invention. In the drawings, like reference numerals refer to like members.

As shown in FIG. 14, the angular acceleration sensor comprises a movable element 112, a stationary element 114, and a pair of torsion spring structures 116 and 118. The torsion spring structure 116 includes a pair of leaf springs 132 and 134, and the torsion spring structure 118 also includes a pair of leaf springs 136 and 138. The leaf spring 132 includes two strain detectors 158, which are connected electrically to electrode pads 126 which are situated on the stationary element 114. The leaf spring 136 has dummy wires 128, whereby its spring characteristics can be adjusted to those of the leaf spring 132.

The angular acceleration sensor is attached to an object of measurement in a manner such that its swing axis SA is in alignment with the swing axis or axis of rotation of the object. The movable element 112 undergoes a torsional displacement with respect to the stationary element 114 under the influence of the force of inertia, depending on angular acceleration that acts on the object of measurement. The torsional displacement is measured in accordance with signals from the strain detectors which are detected through the electrode pads. Since the force of inertia is proportional to the angular acceleration, moreover, the angular acceleration can be obtained from the torsional displacement in accordance with the spring characteristics of the torsion spring structures.

Since the high linearity of the spring characteristics of the torsion spring structures facilitates the calculation of the angular acceleration, so that the torsional rocker of the present invention can be suitably applied to the sensor of this type.

Second Embodiment

An optical scanner using a torsional rocker according to a second embodiment of the present invention will now be described with reference to the drawings of FIGS. 15 to 20. The present embodiment differs from the first embodiment only with respect to torsion spring structures, that is, other portions of the two embodiments are arranged in the same manner. It is to be understood, therefore, that the two embodiments have basically the same function. Accordingly, the following is a description of only the torsion spring structures.

Figure 15:
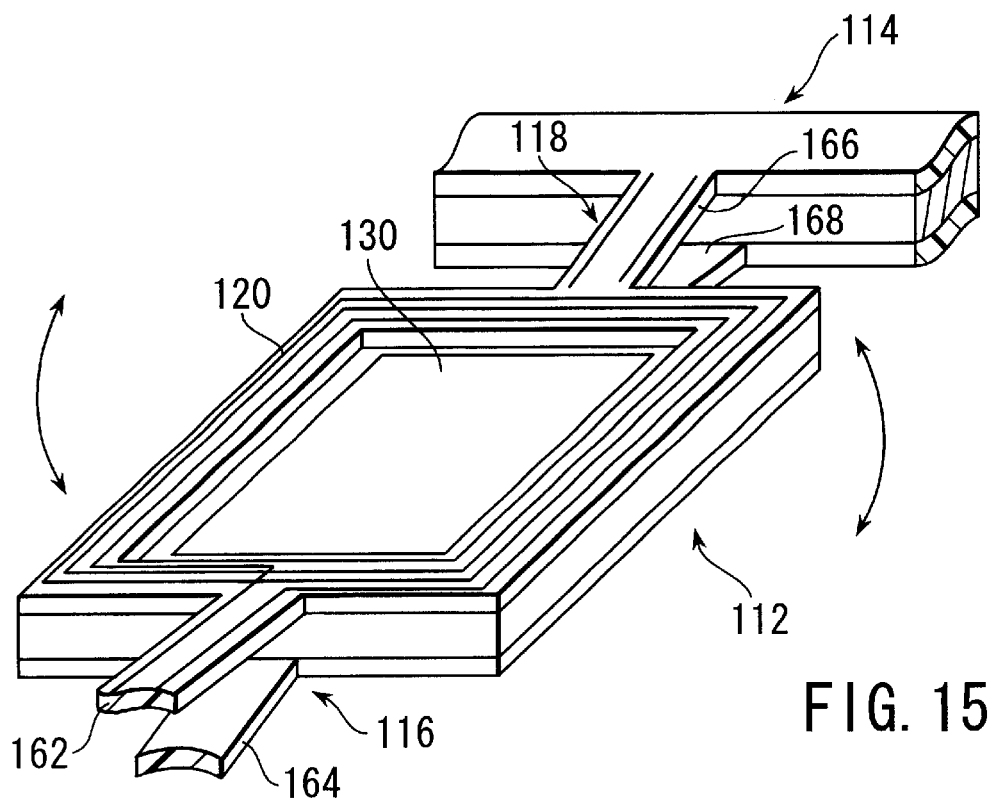
FIG. 15 is a partial perspective view of an optical scanner using a torsional rocker according to a second embodiment of the invention.
Figure 16:
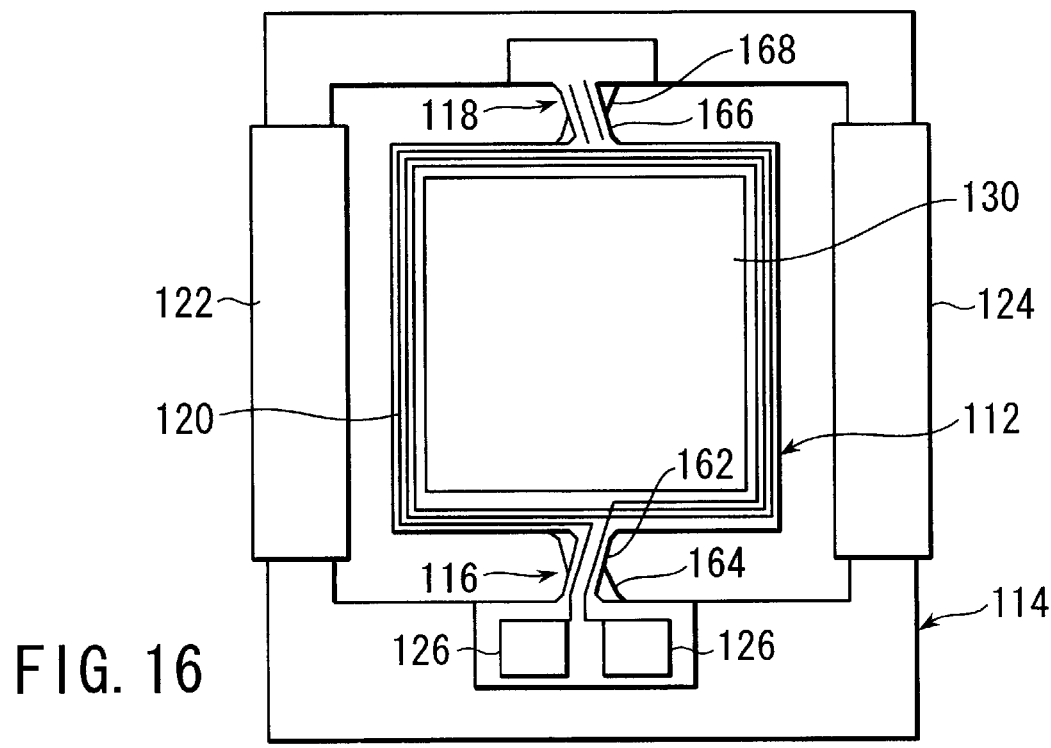
FIG. 16 is a plan view of the optical scanner using the torsional rocker according to the second embodiment.

In the optical scanner of the present embodiment, as shown in FIGS. 15 and 16, a torsion spring structure 116 includes a pair of leaf springs 162 and 164 which are spaced in the thickness direction, and a torsion spring structure 118 includes a pair of leaf springs 166 and 168 which are also spaced in the thickness direction. Each of the leaf springs 162, 164, 166 and 168, which is in the shape of a parallelogram, has a geometric center, which is situated on the swing axis as in the top view of FIG. 16 showing the optical scanner. Further, the paired leaf springs 162 and 164 which constitute the torsion spring structure 116 are arranged symmetrically with respect to the swing axis, and the paired leaf springs 166 and 168 which constitute the torsion spring structure 118 are also arranged symmetrically with respect to the swing axis.

Figure 17:
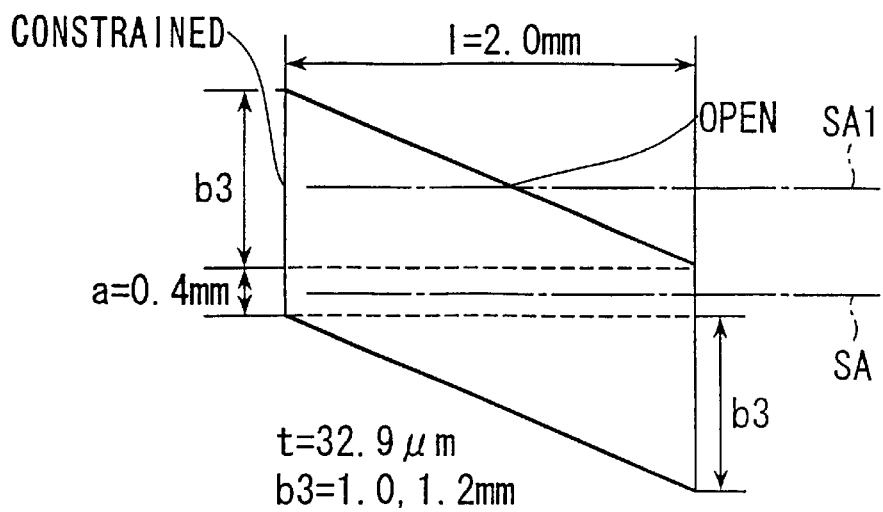
FIG. 17 shows two examples of dimensions of a parallelogrammatic leaf spring constituting the torsion spring structure shown in FIG. 15.
Figure 18:
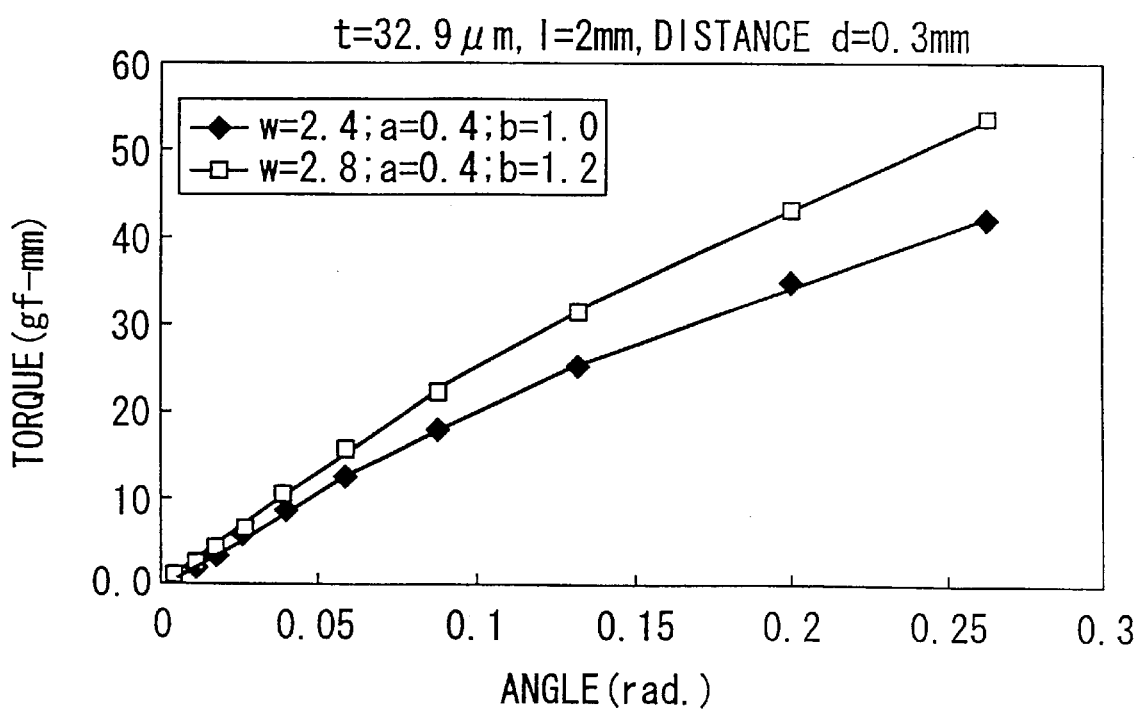
FIG. 18 shows the external torque-torsion characteristics of the pair of torsion spring structures, each of the structures comprising the paired leaf springs shown in FIG. 17.
Figure 19:
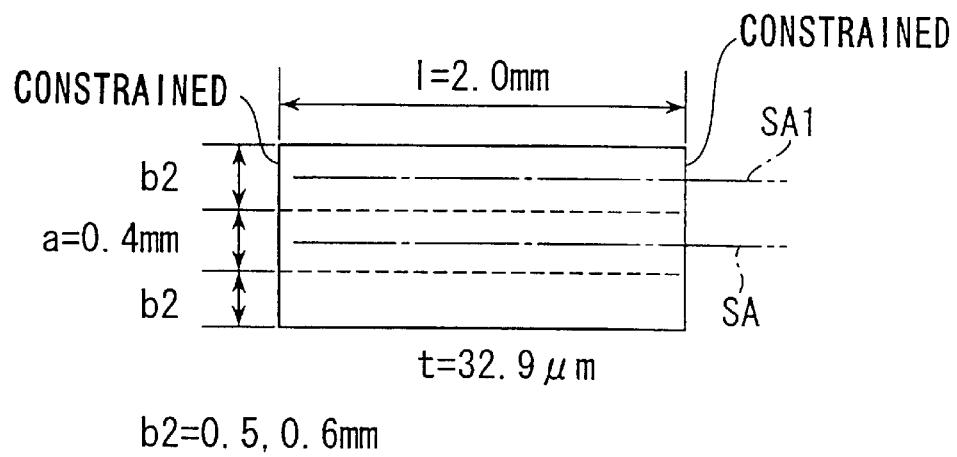
FIG. 19 shows two examples of dimensions of a rectangular leaf spring compared with the leaf spring shown in FIG. 17.
Figure 20:
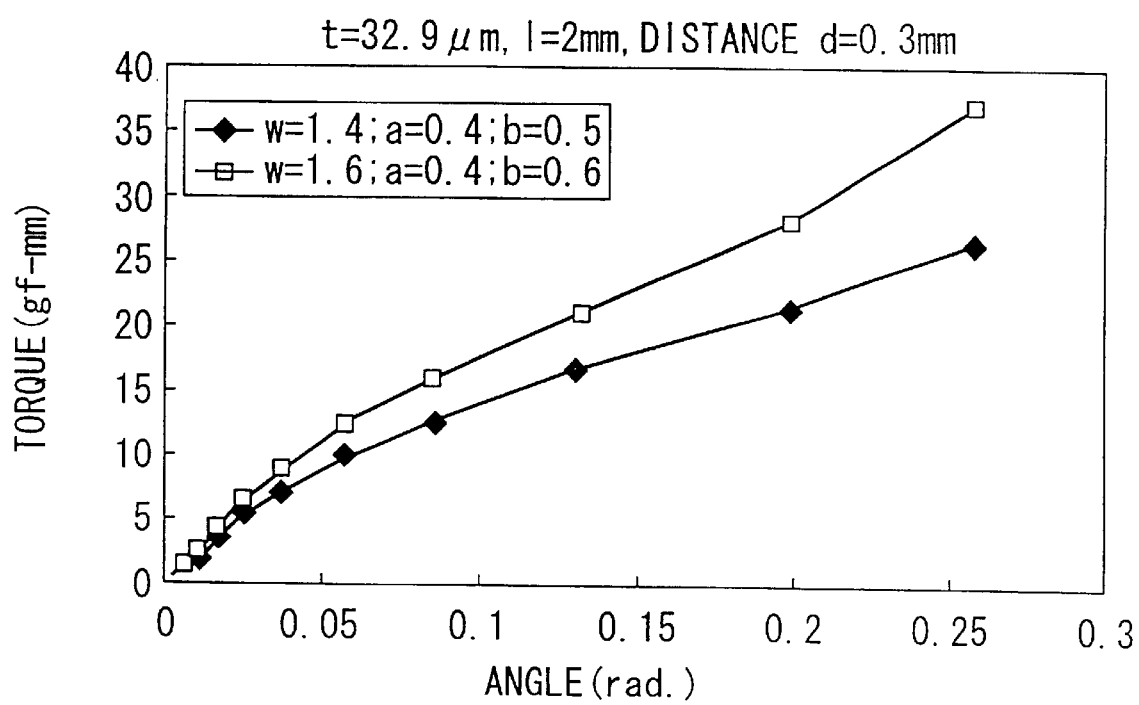
FIG. 20 shows the external torque-torsion characteristics of the pair of torsion spring structures, each of the structures comprising the paired leaf spring shown in FIG. 19.

The following is a description of the spring characteristics of the torsion spring structures of the present embodiment. FIG. 17 shows two examples of dimensions of the parallelogrammatic leaf spring. FIG. 18 shows the external torque-torsion characteristics of a pair of torsion spring structures, each of the structures comprising a pair of leaf springs with these dimensions. For comparison, FIG. 19 shows examples of dimensions of a rectangular leaf spring (i.e., leaf spring of the first embodiment), and FIG. 20 shows the external torque-torsion characteristics of a pair of torsion spring structures, each of the structures comprising a pair of leaf springs with these dimensions. In FIGS. 17 and 19, t and l represent the thickness and length of each leaf spring, respectively.

In either of the parallelogrammatic leaf springs, as shown in FIG. 17, both ends are constrained on an axis parallel to the swing axis SA, in a portion of 0.4 mm width (represented by a in FIG. 17) near the swing axis. In the other portions with a width (represented by b3 in FIG. 17), one end is constrained on an axis SA1 parallel to the swing axis, while the other end is free. Two kinds of shapes of the portions are different in width.

In the rectangular leaf spring, as shown in FIG. 19, on the other hand, both ends are constrained on the axis SA1 parallel to the swing axis SA. The respective widths of the constrained sides are equal to those shown in FIG. 17.

If the leaf springs have the same area, the parallelogrammatic springs are a little higher in stiffness, and the downwardly convex non-linearity is restrained in the region where the torsional angle is large. Although the upwardly convex non-linearity remains in the region where the torsional angle is small, it is somewhat reduced in the parallelogrammatic springs. The non-linearity of the rectangular spring subjected to torsional deformation can be supposed to be attributable to tensile stress that acts on those portions which are distant from the swing axis. According to the present embodiment, the springs are parallelogrammatic in the portions distant from the swing axis, so that the one end is constrained on the axis SA1 parallel to the swing axis, while the other end is free. Since the tensile stress that acts on those portions is reduced, the non-linearity can be supposed to be restrained.

In the portion of 0.4 mm width near the swing axis, according to the present embodiment, moreover, both ends of each spring are entirely constrained on the axis parallel to the swing axis. However, another examination indicates that the non-linearity changes if the width a is changed. More specifically, if the width a is reduced to 0, the "upwardly convex non-linearity" develops. If the width a is increased, the "downwardly convex non-linearity" develops. If the value a is about ¼ to 1 time as large as the distance between the paired leaf springs that constitute each torsion spring structure, on the other hand, a substantially linear characteristic can be obtained.

In the torsional rocker of the present embodiment, as described above, the paired leaf springs that constitute each torsion spring structure are parallelogrammatic, and are arranged symmetrically with respect to the swing axis as shown in the top view. When compared with the case of the rectangular leaf spring, therefore, the stiffness is improved, and the non-linearity is restrained.

The configuration of the present invention, like that of the first embodiment, may be changed or modified variously.

Third Embodiment

An optical scanner using a torsional rocker according to a third embodiment of the present invention will now be described with reference to the drawings of FIGS. 21 to 24.

The present embodiment differs from the first embodiment only with respect to torsion spring structures, that is, other portions of the two embodiments are arranged in the same manner. Therefore, the two embodiments have basically the same function. Accordingly, the following is a description of only the torsion spring structures.

Figure 21:
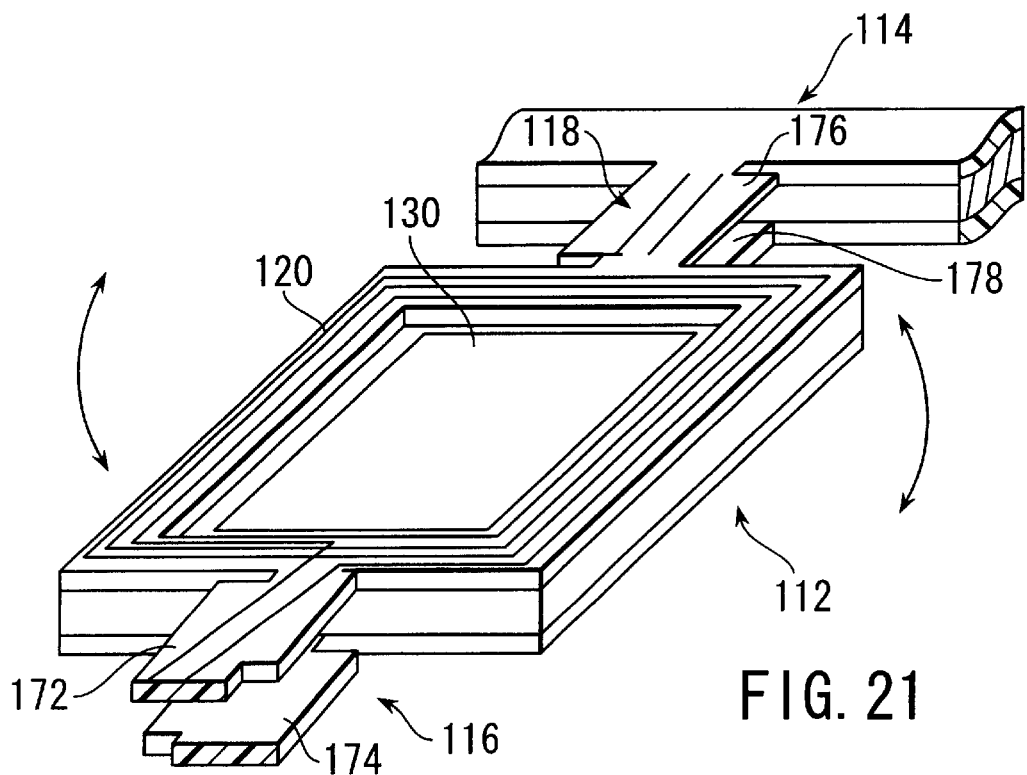
FIG. 21 is a partial perspective view of an optical scanner using a torsional rocker according to a third embodiment of the invention.

In the optical scanner of the present embodiment, as shown in FIG. 21, a torsion spring structure 116 includes a pair of leaf springs 172 and 174 which are spaced in the thickness direction, and a torsion spring structure 118 includes a pair of leaf springs 176 and 178 which are also spaced in the thickness direction. The leaf springs 172, 174, 176 and 178 have the same shape, substantially rectangular. Each leaf spring has notches, each of which extends from one end portion of the junction between the spring and the movable element 112 or the stationary element 114. The notches are symmetrical with respect to the geometric center of the spring.

Figure 22:
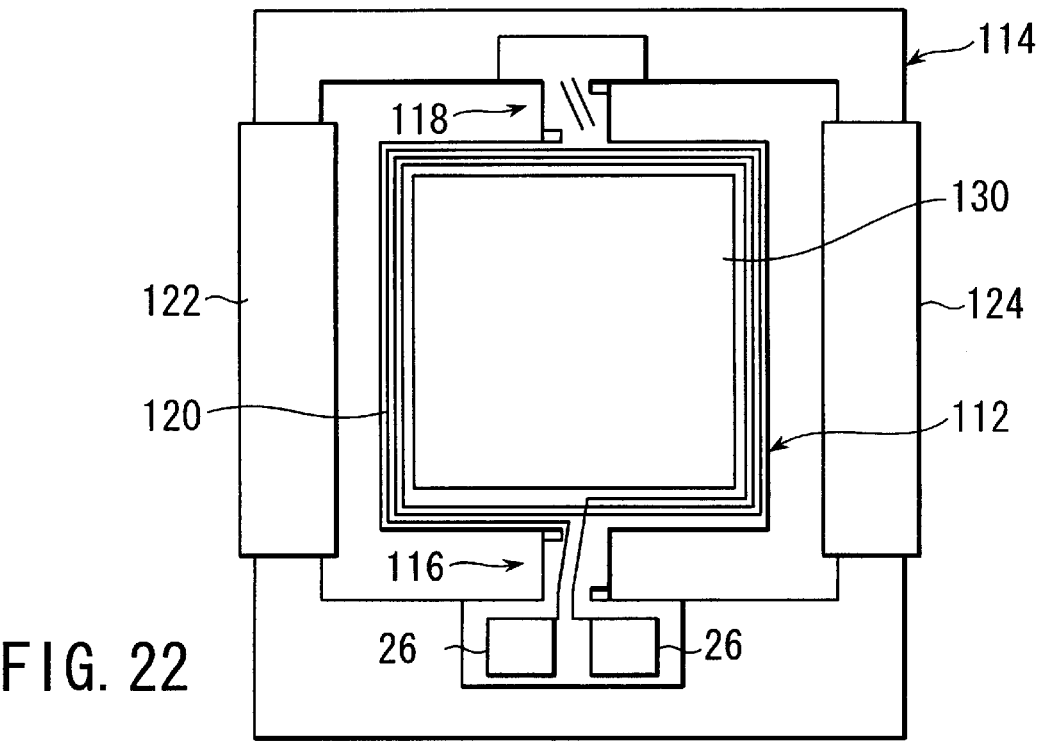
FIG. 22 is a plan view of the optical scanner using the torsional rocker according to the third embodiment.

Further, each of the leaf springs 172, 174, 176 and 178 has a geometric center, which is situated on the swing axis as in the top view of FIG. 22 showing the optical scanner. Furthermore, the paired leaf springs 172 and 174 which constitute the torsion spring structure 116 are arranged symmetrically with respect to the swing axis, and the paired leaf springs 176 and 178 which constitute the torsion spring structure 118 are also arranged symmetrically with respect to the swing axis.

Thus, those portions of each of the leaf springs 172, 174, 176 and 178 which are constrained or connected to the movable element 112 and the stationary element 114 constitute part of substantially rectangular opposite sides which are symmetrical with respect to the center, as in the case of the second embodiment.

Figure 23:
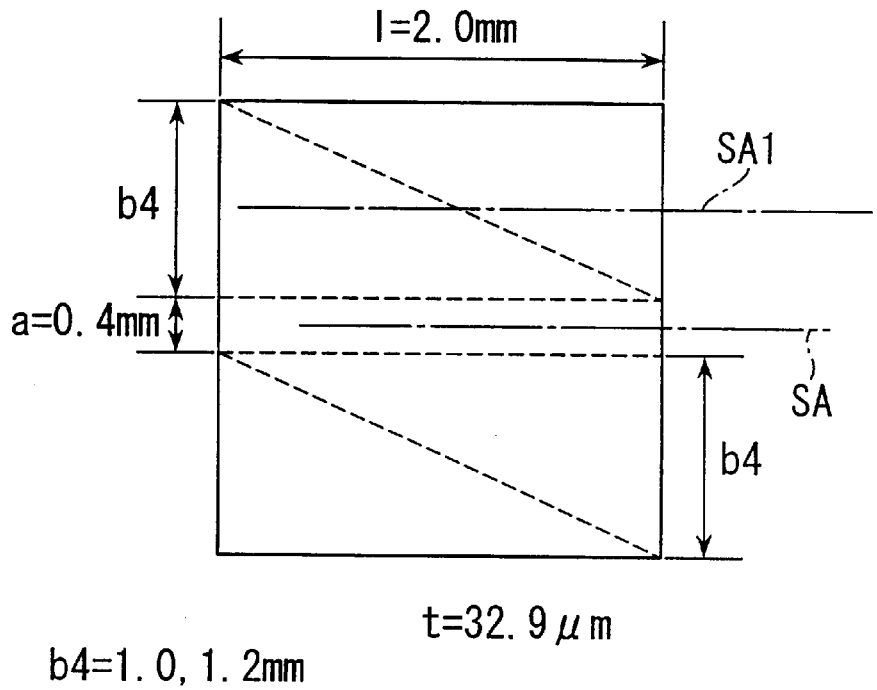
FIG. 23 shows two examples of dimensions of a substantially rectangular leaf spring constituting the torsion spring structure shown in FIG. 21.
Figure 24:
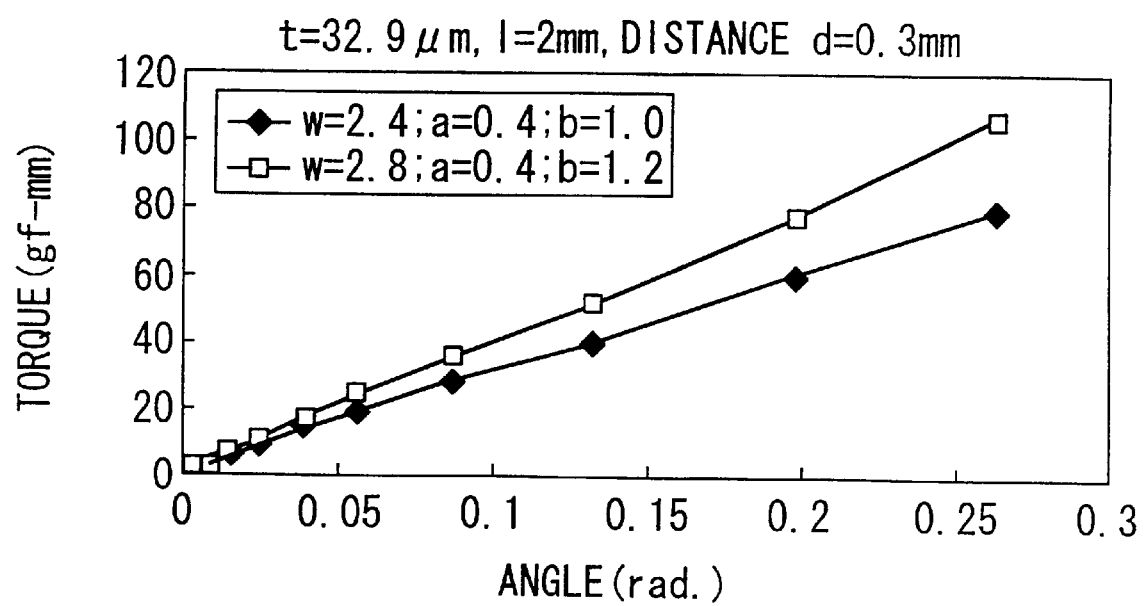
FIG. 24 shows the external torque-torsion characteristics of the pair of torsion spring structures, each of the structures comprising the paired leaf springs shown in FIG. 23.

The following is a description of spring characteristics according to the present embodiment. FIG. 23 shows two examples of dimensions of the substantially rectangular leaf spring, and FIG. 24 shows the external torque-torsion characteristics of a pair of torsion spring structures, each of the structures comprising a pair of leaf springs with these dimensions. In FIG. 23, t and l represent the thickness and length of each leaf spring, respectively.

In each of the leaf springs of the present embodiment, as shown in FIG. 23, both ends are constrained on an axis parallel to the swing axis SA, in a portion of 0.4 mm width (represented by a in FIG. 23) near the swing axis. In the other portions with a width (represented by b4 in FIG. 23), one end is constrained on the axis SA1 parallel to the swing axis, while the other end is free. Two kinds of shapes of the portions are different in width.

As is evident from comparison between the characteristics of FIGS. 18 and 24, the torsion spring structure that comprises substantially rectangular leaf springs of a wider area substantially doubles in stiffness, although the width of each constrained portion and the length of each leaf spring are fixed. At the same time, the non-linearity is restrained for any torsional angle.

In the torsional rocker of the present embodiment, as described above, the paired leaf springs which constitute each torsion spring structure are substantially rectangular, and the positions in which the leaf springs are constrained to the movable element 112 and the stationary element 114, at both ends of each spring, are symmetrical with respect to the swing axis as shown in the top view. When compared with the case of the parallelogrammatic leaf spring, therefore, the stiffness is further improved, and the non-linearity is restrained.

The configuration of the present invention, like that of the first embodiment, may be changed or modified variously.

Fourth Embodiment

An optical scanner using a torsional rocker according to a fourth embodiment of the present invention will now be described with reference to the drawings of FIGS. 25 to 28. The present embodiment differs from the first embodiment only with respect to torsion spring structures, that is, other portions of the two embodiments are arranged in the same manner. Therefore, the two embodiments have basically the same function. Accordingly, the following is a description of only the torsion spring structures.

Figure 25:
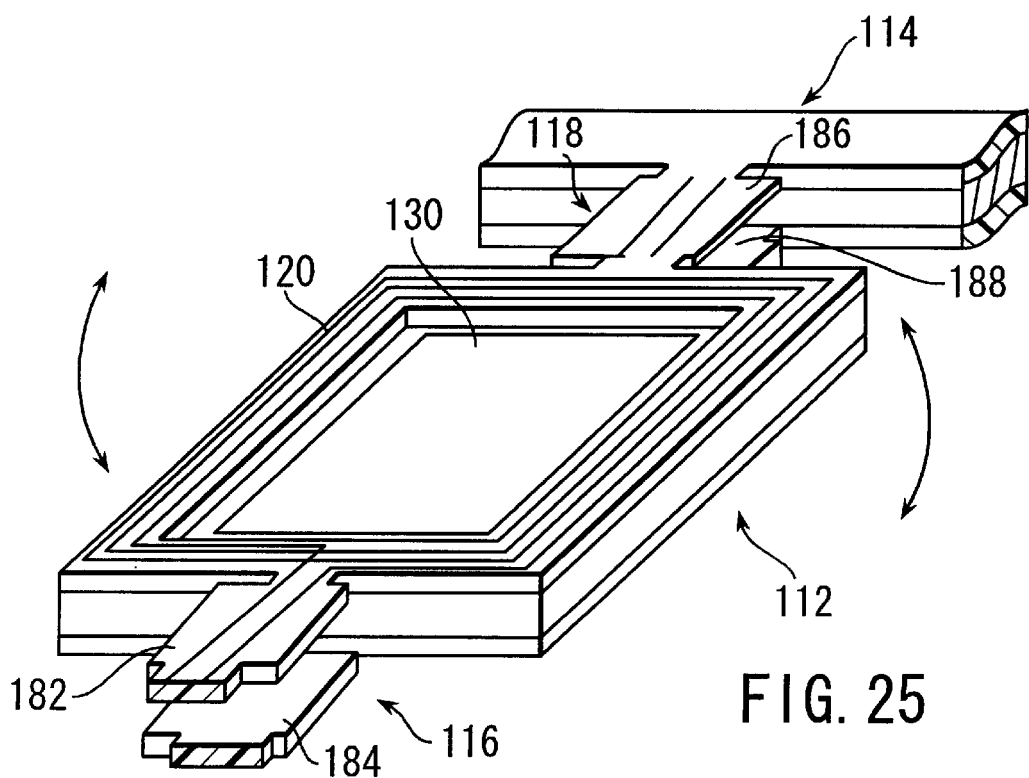
FIG. 25 is a partial perspective view of an optical scanner using a torsional rocker according to a fourth embodiment of the invention.

In the optical scanner of the present embodiment, as shown in FIG. 25, a torsion spring structure 116 includes a pair of leaf springs 182 and 184 which are spaced in the thickness direction, and a torsion spring structure 118 includes a pair of leaf springs 186 and 188 which are also spaced in the thickness direction. The leaf springs 182, 184, 186 and 188 have the same shape, substantially rectangular. Each leaf spring has notches which extend individually from the opposite ends of the junction between the spring and the movable element 112 or the stationary element 114. The notches are symmetrical with respect to the geometric center of the spring.

Figure 26:
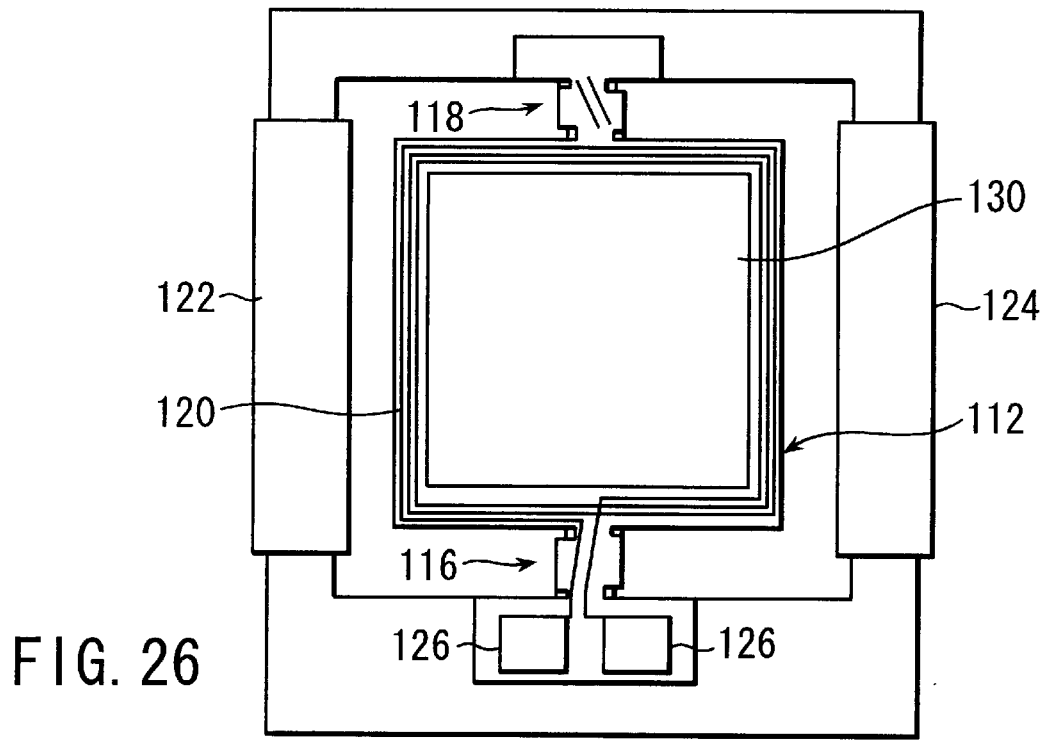
FIG. 26 is a plan view of the optical scanner using the torsional rocker according to the fourth embodiment.

Further, each of the leaf springs 182, 184, 186 and 188 has a geometric center, which is situated on the swing axis as in the top view of FIG. 26 showing the optical scanner. Furthermore, the paired leaf springs 182 and 184 which constitute the torsion spring structure 116 are arranged symmetrically with respect to the swing axis, and the paired leaf springs 186 and 188 which constitute the torsion spring structure 118 are also arranged symmetrically with respect to the swing axis.

Figure 27:
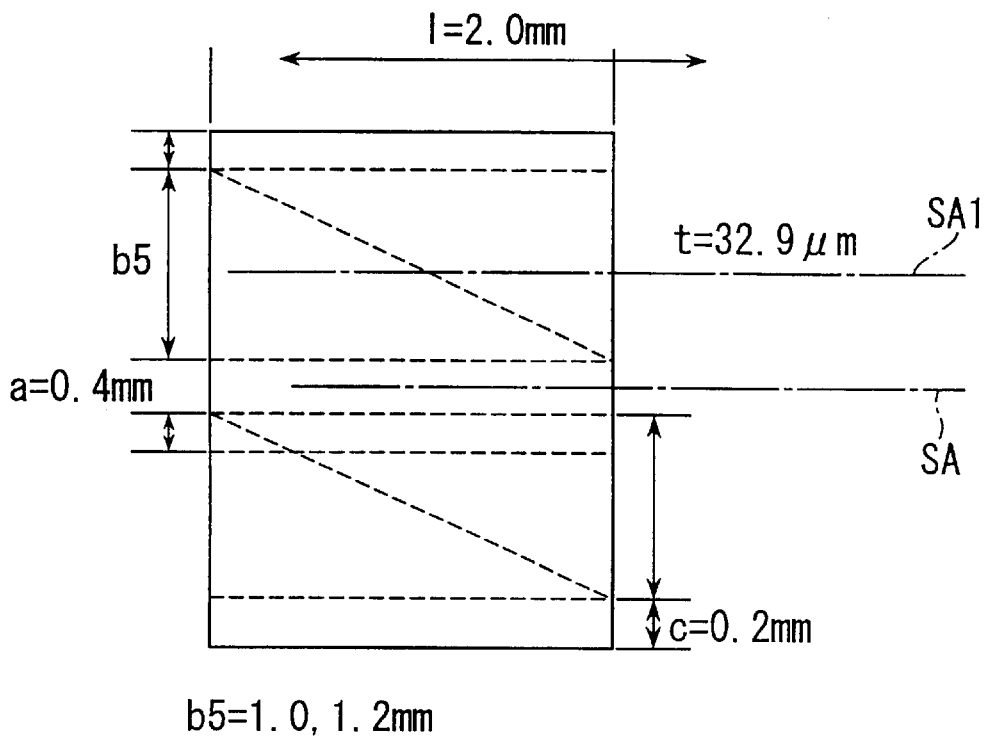
FIG. 27 shows two examples of dimensions of a substantially rectangular leaf spring constituting the torsion spring structure shown in FIG. 25.
Figure 28:
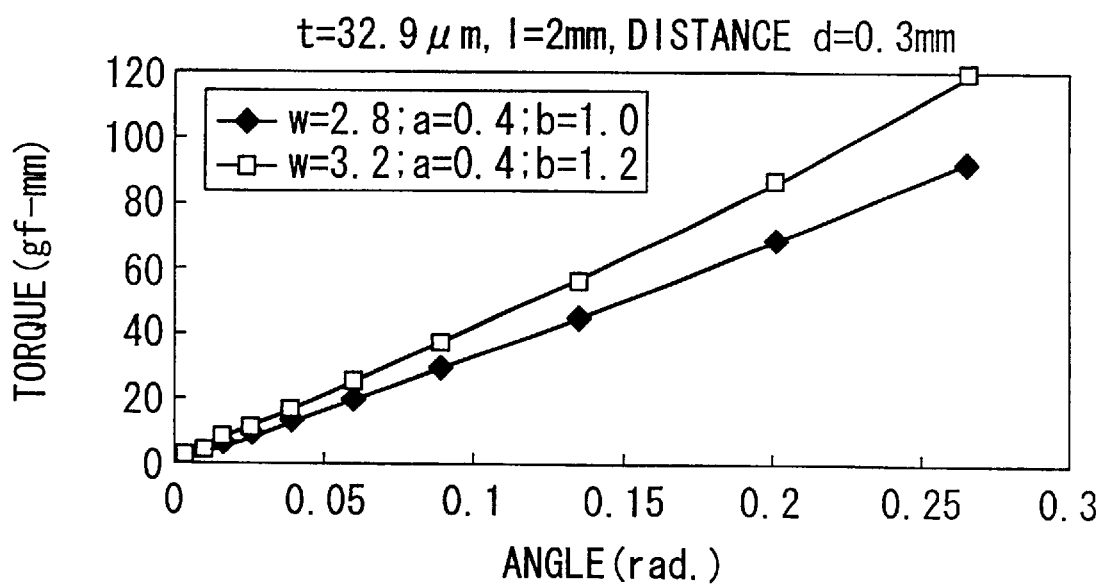
FIG. 28 shows the external torque-torsion characteristics of the pair of torsion spring structures each of the structures comprising the paired leaf springs shown in FIG. 27.

The following is a description of spring characteristics according to the present embodiment. FIG. 27 shows two examples of dimensions of the substantially rectangular leaf spring, and FIG. 28 shows the external torque-torsion characteristics of a pair of torsion spring structures, each of the structures comprising a pair of leaf springs with these dimensions. In FIG. 27, t and l represent the thickness and length of each leaf spring, respectively.

In each of the leaf springs of the present embodiment, as shown in FIG. 27, both ends are constrained on an axis parallel to the swing axis SA, in a portion of 0.4 mm width (represented by a in FIG. 27) near the swing axis. In portions with a width (represented by b5 in FIG. 27), which are on outer sides of the first portion, one end is constrained on the axis SA1 parallel to the swing axis, while the other end is free. Two kinds of shapes of the portions are different in width. In the other portions of 0.2 mm width (represented by c in FIG. 27), which are on outer sides of the second portions, both ends are free.

As is evident from comparison between the characteristics of FIGS. 24 and 28, the leaf spring that includes portions having free two ends far from the swing axis is somewhat improved in stiffness, although the width of each constrained portion and the length of each leaf spring are fixed. At the same time, the non-linearity is restrained for any torsional angle. According to the present embodiment, the free end portion of 0.2 mm width is provided on each side edge of each leaf spring. Another examination indicates that it is not very effective to widen the free end portion and the optimum value of the width ranges from about 0.2 to 0.4 mm.

The configuration of the present invention, like that of the first embodiment, may be changed or modified variously.

Fifth Embodiment

Figure 30:
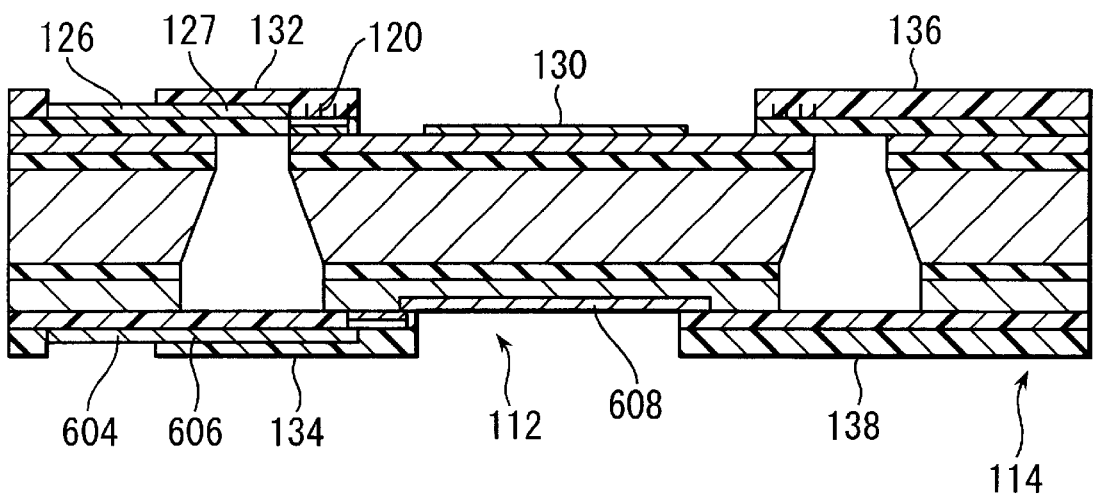
FIG. 30 is a profile of an optical scanner according to a modification of the fifth embodiment, provided with a photodiode in place of a coil.
Figure 31:
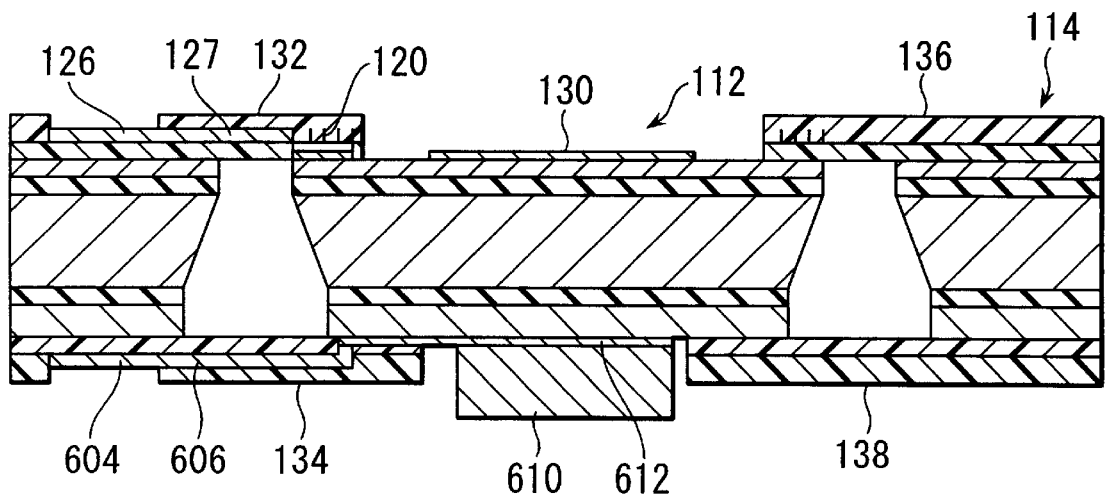
FIG. 31 is a profile of an optical scanner according to another modification of the fifth embodiment, provided with an electrode and a light source in place of the coil.
Figure 32:
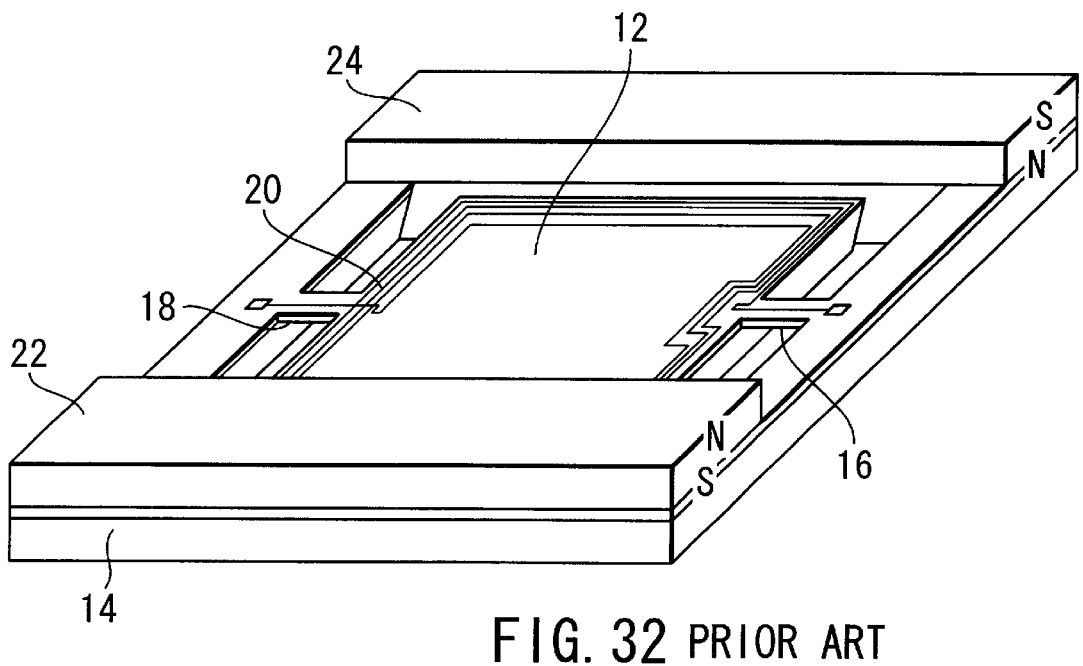
FIG. 32 is a perspective view of an optical scanner using torsional rocker described in Jpn. Pat. Appln. KOKAI Publication No. 10-123449.

An optical scanner using a torsional rocker according to a fifth embodiment of the present invention will now be described with reference to the drawings of FIGS. 29 to 31. In the drawings, like reference numerals refer to like members. A permanent magnet which constitutes an electrostatic actuator is not shown.

The present embodiment differs from the first embodiment only in that it includes an element or circuit for detecting the movement of the movable element, that is, other portions of the two embodiments are arranged in the same manner. In the description to follow, therefore, stress will be laid on the point of difference.

Figure 29:
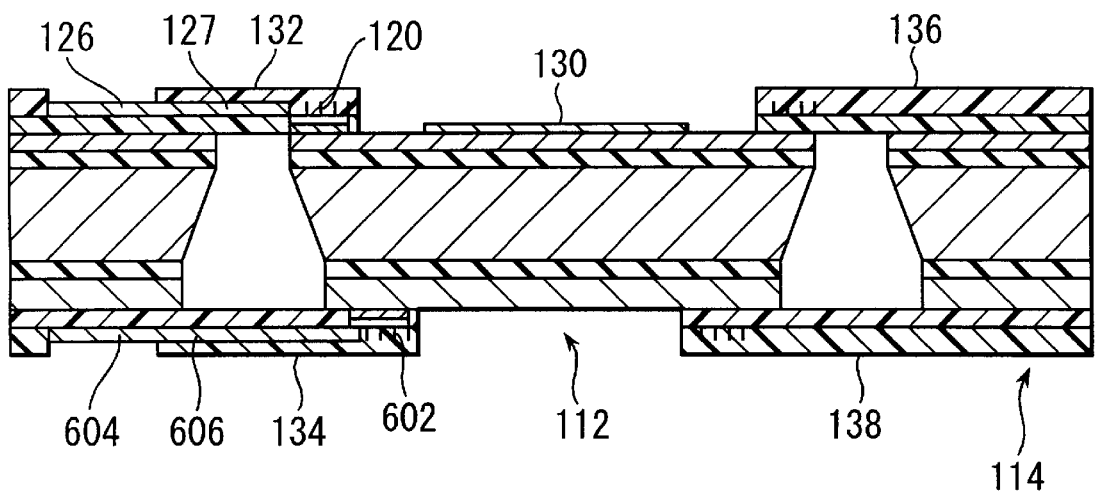
FIG. 29 is a profile of an optical scanner using a torsional rocker according to a fifth embodiment of the invention.

In the optical scanner of the present embodiment, as shown in FIG. 29, a movable element 112 is provided not only with a coil 120 on its obverse side but with a coil 602 which, similar to the coil 120, is located on the reverse side. The opposite ends of the coil 602 is connected electrically to a pair of electrode pads 604 by means of a pair of wires 606 which extend in a leaf spring 134.

The following is a description of the operation of the present invention. As shown in FIG. 29, for example, the coil 120 on the obverse side of the movable element 112 is used as a driving coil, and the coil 602 on the reverse side as a detecting coil. The movable element 112, like the ones according to the first to fourth embodiments, rocks around a swing axis (not shown) as it is subjected to Lorentz force which is produced by interactions with an external magnetic field when current is supplied to the driving coil 120.

As the movable element 112 rocks, the detecting coil 602 on the reverse side moves in the magnetic field, so that induced electromotive force proportional to speed is generated. Thus, amplitude control of the movable element 112 and the like can be carried out in accordance with the induced electromotive force which is detected through the electrode pads 604.

The torsional rocker of the present embodiment, like the ones according to the foregoing embodiments, includes a pair of torsion spring structures which comprise a pair of leaf springs each, so that the stiffness is improved, and the non-linearity is restrained. Besides, the torsional rocker has the coil for detecting the movement of the movable element, so that the amplitude control of the movable element can be effected.

If the coil for detecting the movement of the movable element is provided on any other surface than the one on which the driving coil is located, moreover, these coils can be positioned optimally. In this case, wire connection from the coils to a stationary element, which is conventionally difficult, can be facilitated by the use of the paired torsion spring structures which are formed of a pair of leaf springs each.

The configuration of the present invention may be changed or modified variously. For example, the shapes and the ways of restriction described in connection with the first to fourth embodiments are applicable to the leaf springs 132, 134, 136 and 138, only the side faces of which are shown in FIG. 29. Effects that are proper to the individual leaf springs can be also obtained according to modifications of the present embodiment.

An alternative electric element may be provided in place of the coil 602 on the reverse side of the movable element 112. For example, the coil 602 may be replaced with an integral photodiode (PD) 608, as shown in FIG. 30, or an electrode 612 connecting with the wires 606 and a light source 610, such as a light emitting diode (LED) or semiconductor laser (LD), connected electrically to the electrode, as shown in FIG. 31. In the end, the advantages of the present embodiment can be enjoyed in the case where electrical connection is required between the movable element 112 and the stationary element 114.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A torsional rocker comprising:
    a movable element having first and second opposite ends and a primary plane;
    first and second torsion spring structures for rockably supporting the movable element at the first and second opposite ends, respectively; and
    fixing means for fixing the torsion spring structures;
    wherein each of the torsion spring structures comprises a pair of leaf springs that extend parallel to each other and that are spaced apart from each other in a direction normal to the primary plane of the movable element; and
    wherein a swing axis of the movable element extends between the paired leaf springs of the torsion spring structures.

2. A torsional rocker according to claim 1, wherein said paired leaf springs of each said torsion spring structure have a same shape.

3. A torsional rocker according to claim 2, wherein:
    a distance between respective opposite surfaces of said paired leaf springs is shorter than a width of each said leaf spring,
    the width of each said leaf spring is a dimension perpendicular to a length and thickness of each said leaf spring,
    the length of each said leaf spring is a dimension parallel to the swing axis of said movable element, and
    the thickness of each said leaf spring is a dimension perpendicular to the respective opposite surfaces of said paired leaf springs.

4. A torsional rocker according to claim 2, wherein:
    each said leaf spring has a rectangular shape,
    said paired leaf springs are located symmetrically with respect to the swing axis of said movable element, and
    both ends of each said leaf spring are entirely constrained on an axis parallel to the swing axis.

5. A torsional rocker comprising:
    a movable element having opposite ends;
    a pair of torsion spring structures for rockably supporting the movable element at both of the opposite ends; and
    fixing means for fixing the torsion spring structures;
    wherein each of the torsion spring structures comprises a pair of leaf springs extending parallel to each other with a swing axis between the paired leaf springs; and
    wherein each said leaf spring has a parallelogrammatic shape, said paired leaf springs are located symmetrically with respect to the swing axis, and each said leaf spring includes a first portion near the swing axis, the first portion having two ends both of which are constrained on an axis parallel to the swing axis, and second portions on outer sides of the first portion, the second portions having two ends one of which is constrained on the swing axis and the other one of which is free, the first and second portions being integral and continuous with one another.

6. A torsional rocker comprising:

a movable element having opposite ends;

a pair of torsion spring structures for rockably supporting the movable element at both of the opposite ends; and fixing means for fixing the torsion spring structures;

wherein each of the torsion spring structures comprises a pair of leaf springs extending parallel to each other with a swing axis between the paired leaf springs; and wherein each said leaf spring has a substantially rectangular shape, said paired leaf springs are located symmetrically with respect to the swing axis, and each said leaf spring includes a first portion near the swing axis, the first portion having two ends both of which are constrained on an axis parallel to the swing axis, and second portions on outer sides of the first portion, the second portions having two ends one of which is constrained on the swing axis and the other one of which is free, the first and second portions being integral and continuous with one another.

7. A torsional rocker according to claim 6, wherein each said leaf spring further includes third portions on outer sides of the second portions, the third portions having two ends both of which are free on the swing axis, and the first, second and third portions being integral and continuous with one another.

8. A torsional rocker according to claim 5, wherein said first portion of each said leaf spring has a width ¼ to 1 time as large as a distance between the paired leaf springs.

9. A torsional rocker according to claim 1, wherein said movable element and said fixing means are formed from a same plate member, and each said leaf spring includes a film formed on the plate member.

10. A torsional rocker according to claim 9, wherein said movable element and said fixing means each comprise a semiconductor or insulating substrate, and each said leaf spring includes a film formed on the substrate.

11. A torsional rocker comprising:

a movable element having an end and a primary plane;

a torsion spring structure for rockably supporting the movable element at only the end; and fixing means for fixing the torsion spring structure;

wherein the torsion spring structure comprises a pair of leaf springs that extend parallel to each other and that are spaced apart from each other in a direction normal to the primary plane of the movable element; and wherein a swing axis of the movable element extends between the paired leaf springs of the torsion spring structure.

12. A torsional rocker according to claim 11, wherein said paired leaf springs of the torsion spring structure have a same shape.

13. A torsional rocker according to claim 12, wherein:

a distance between respective opposite surfaces of said paired leaf springs is shorter than a width of each said leaf spring, the width of each said leaf spring is a dimension perpendicular to a length and thickness of each said leaf spring, the length of each said leaf spring is a dimension parallel to the swing axis of said movable, and the thickness of each said leaf spring is a dimension perpendicular to the respective opposite surfaces of said paired leaf springs.

14. A torsional rocker according to claim 12, wherein:

each said leaf spring has a rectangular shape, said paired leaf springs are located symmetrically with respect to the swing axis of said movable element, and both ends of each said leaf spring are entirely constrained on an axis parallel to the swing axis.

15. A torsional rocker comprising:

a movable element having an end;

a torsion spring structure for rockably supporting the movable element at only the end; and fixing means for fixing the torsion spring structure, wherein the torsion spring structure comprises a pair of leaf springs extending parallel to each other with a swing axis between the paired leaf springs;

wherein each said leaf spring has a parallelogrammatic shape, said paired leaf springs are located symmetrically with respect to the swing axis, and each said leaf spring includes a first portion near the swing axis, the first portion having two ends both of which are constrained on an axis parallel to the swing axis, and second portions on outer sides of the first portion, the second portions having two ends one of which is constrained on the swing axis and the other one of which is free, the first and second portions being integral and continuous with one another.

16. A torsional rocker comprising:

a movable element having an end;

a torsion spring structure for rockably supporting the movable element at only the end; and fixing means for fixing the torsion spring structure, wherein the torsion spring structure comprises a pair of leaf springs extending parallel to each other with a swing axis between the paired leaf springs;

wherein each said leaf spring has a substantially rectangular shape, said paired leaf springs are located symmetrically with respect to the swing axis, and each said leaf spring includes a first portion near the swing axis, the first portion having two ends both of which are constrained on an axis parallel to the swing axis, and second portions on outer sides of the first portion, the second portions having two ends one of which is constrained on the swing axis and the other one of which is free, the first and second portions being integral and continuous with one another.

17. A torsional rocker according to claim 16, wherein each said leaf spring further includes third portions on outer sides of the second portions, the third portions having two ends both of which are free on the swing axis, and the first, second and third portions being integral and continuous with one another.

18. A torsional rocker according to claim 15, wherein said first portion of each said leaf spring has a width ¼ to 1 time as large as a distance between the paired leaf springs.

19. A torsional rocker according to claim 11, wherein said movable element and said fixing means are formed from a same plate member, and each said leaf spring includes a film formed on the plate member.

20. A torsional rocker according to claim 19, wherein said movable element and said fixing means each comprise a semiconductor or insulating substrate, and each said leaf spring includes a film formed on the substrate.

\* \* \* \* \*